(12) United States Patent
Ten Holter

(10) Patent No.: US 6,351,083 B1
(45) Date of Patent: Feb. 26, 2002

(54) CIRCUIT FOR SELECTIVE POWER SUPPLY TO ELECTRICAL UNITS

(75) Inventor: Ronaldus Paulus Maria Ten Holter, Valkenswaard (NL)

(73) Assignee: Ten Holter Consultancy (NL)

( * ) Notice: Subject to any disclaimer, the term of this patent is extended or adjusted under 35 U.S.C. 154(b) by 0 days.

(21) Appl. No.: 09/341,056

(22) PCT Filed: Jan. 2, 1999

(86) PCT No.: PCT/NL98/00001

§ 371 Date: Sep. 2, 1999

§ 102(e) Date: Sep. 2, 1999

(87) PCT Pub. No.: WO98/31086

PCT Pub. Date: Jul. 16, 1998

(30) Foreign Application Priority Data

Jan. 6, 1997 (NL) ............................................. 1004934

(51) Int. Cl.[7] ............................................. H05B 37/00
(52) U.S. Cl. ........................ 315/315; 315/309; 361/89; 361/106; 219/508; 219/485
(58) Field of Search ................................. 315/312–315, 315/318, 320, 309, 362, 293; 361/42, 51, 48, 113, 115, 89, 104–106; 219/250, 507, 508, 485

(56) References Cited

U.S. PATENT DOCUMENTS 4,415,850 A * 11/1983 Sherwood .................. 361/42 X 5,352,957 A * 10/1994 Werner ........................ 315/291
5,645,746 A * 7/1997 Walsh ......................... 219/505

FOREIGN PATENT DOCUMENTS

| DE | 40 15 816 A1 | 11/1991 |
|---|---|---|
| DE | 44 25 469 A1 | 1/1996 |
| EP | 0 294 256 A1 | 12/1988 |
| FR | 2 583 229 A1 | 12/1986 |
| FR | 2 643 196 A1 | 4/1990 |
| WO | WO 95/06352 | 3/1995 |
| WO | WO 95/26062 | 9/1995 |

* cited by examiner

*Primary Examiner*—Haissa Philogene
(74) *Attorney, Agent, or Firm*—Webb Ziesenheim Logsdon Orkin & Hanson, P.C.

(57) ABSTRACT

A circuit is provided for selectively providing electric supply voltage from an input feed line with a neutral conductor, a phase conductor and optionally an earth conductor to individual or parallel-connected groups of connected terminals each comprising a phase core, a neutral core and optionally an earth core, to which electrical units using electricity, for instance light fittings, are or can be connected, which circuit includes: a neutral connection between the neutral conductor and each neutral core; optionally an earth connection between each earth conductor and each earth core; a phase connection between the phase conductor and each phase core, in which phase connection is arranged a current control element; and an overcurrent safety element, for instance a fuse, which is incorporated in each phase connection and which limits the current to the maximum value determined for the relevant phase connection.

15 Claims, 29 Drawing Sheets

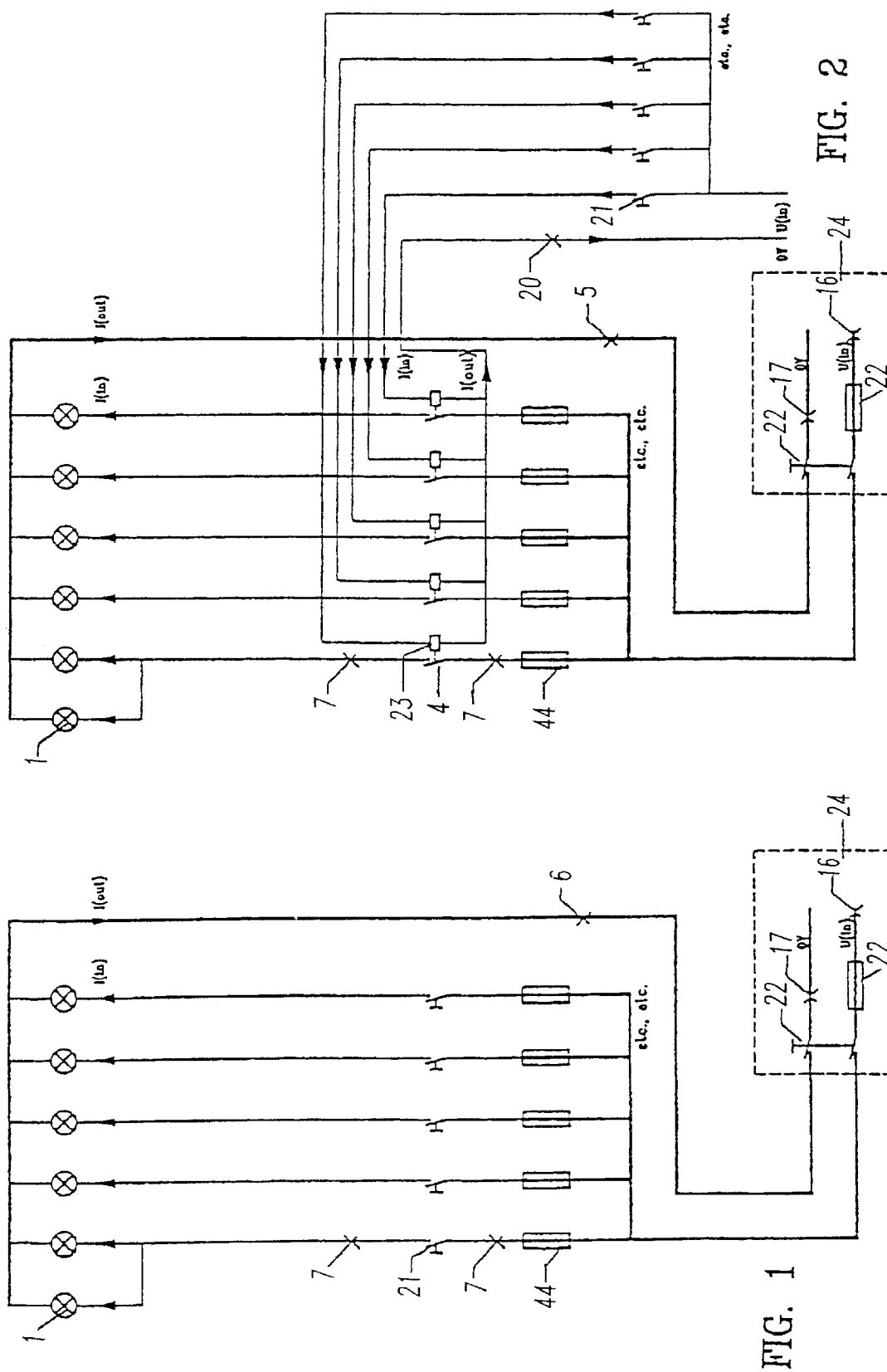

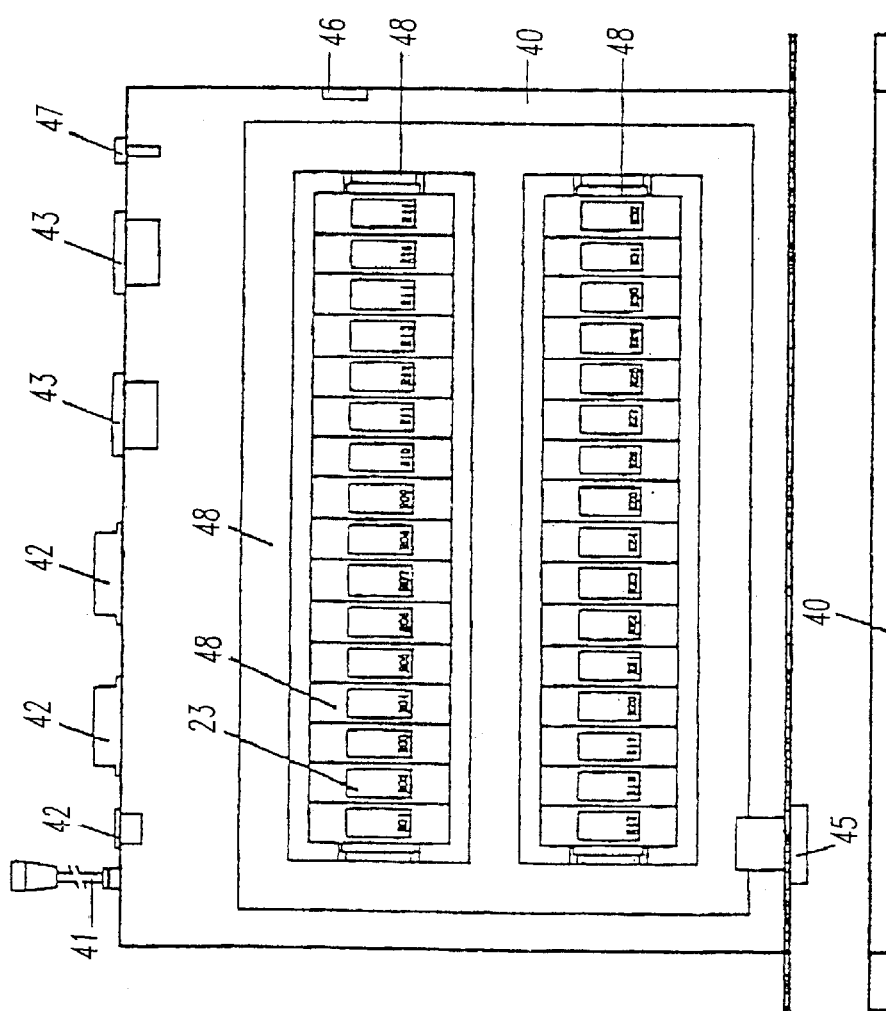
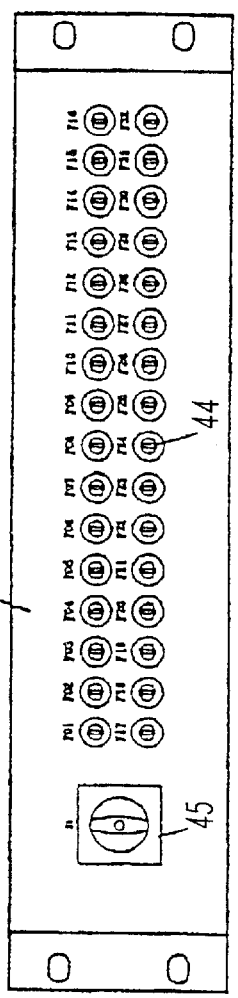
FIG. 7A
FIG. 7B

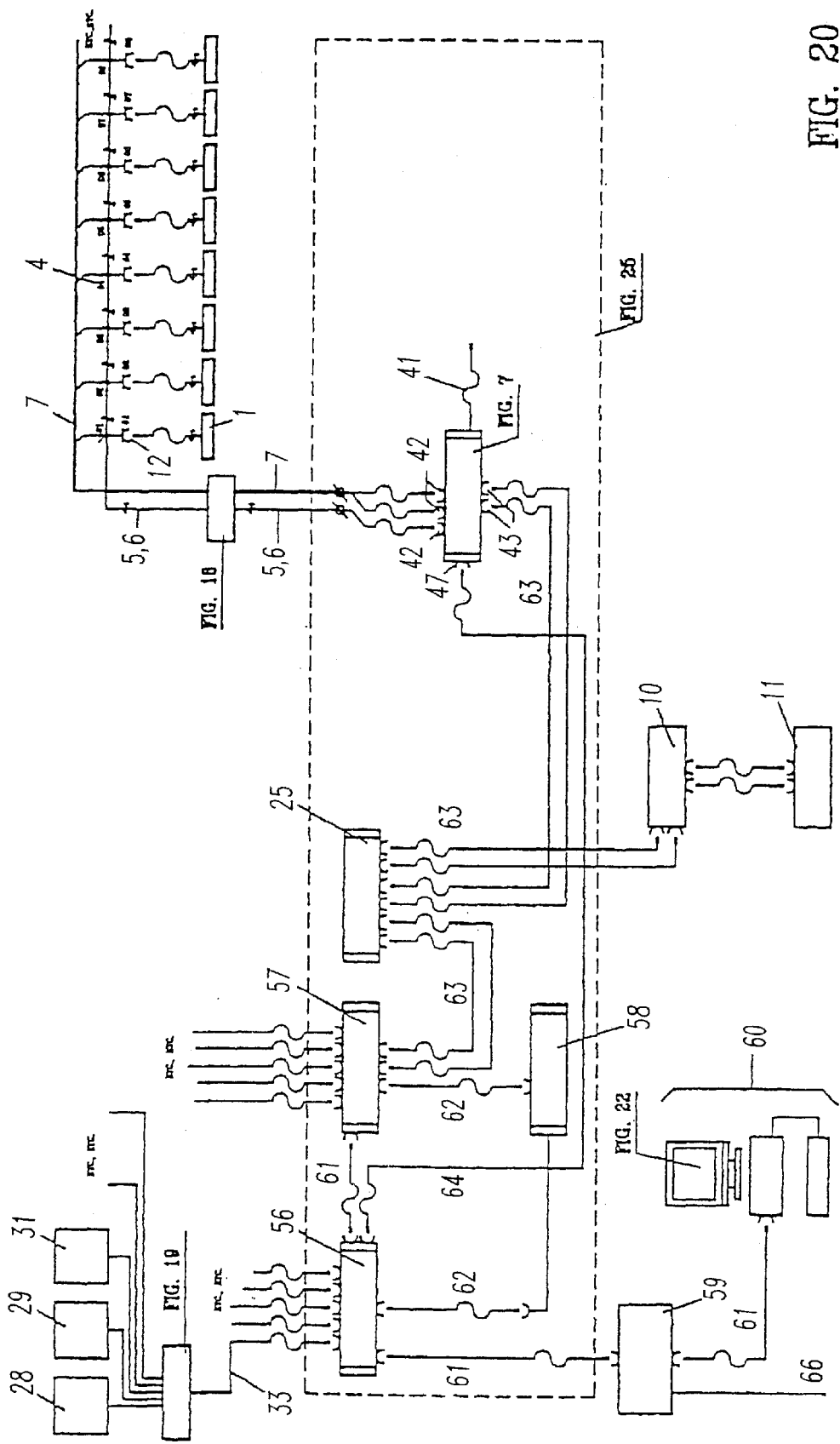

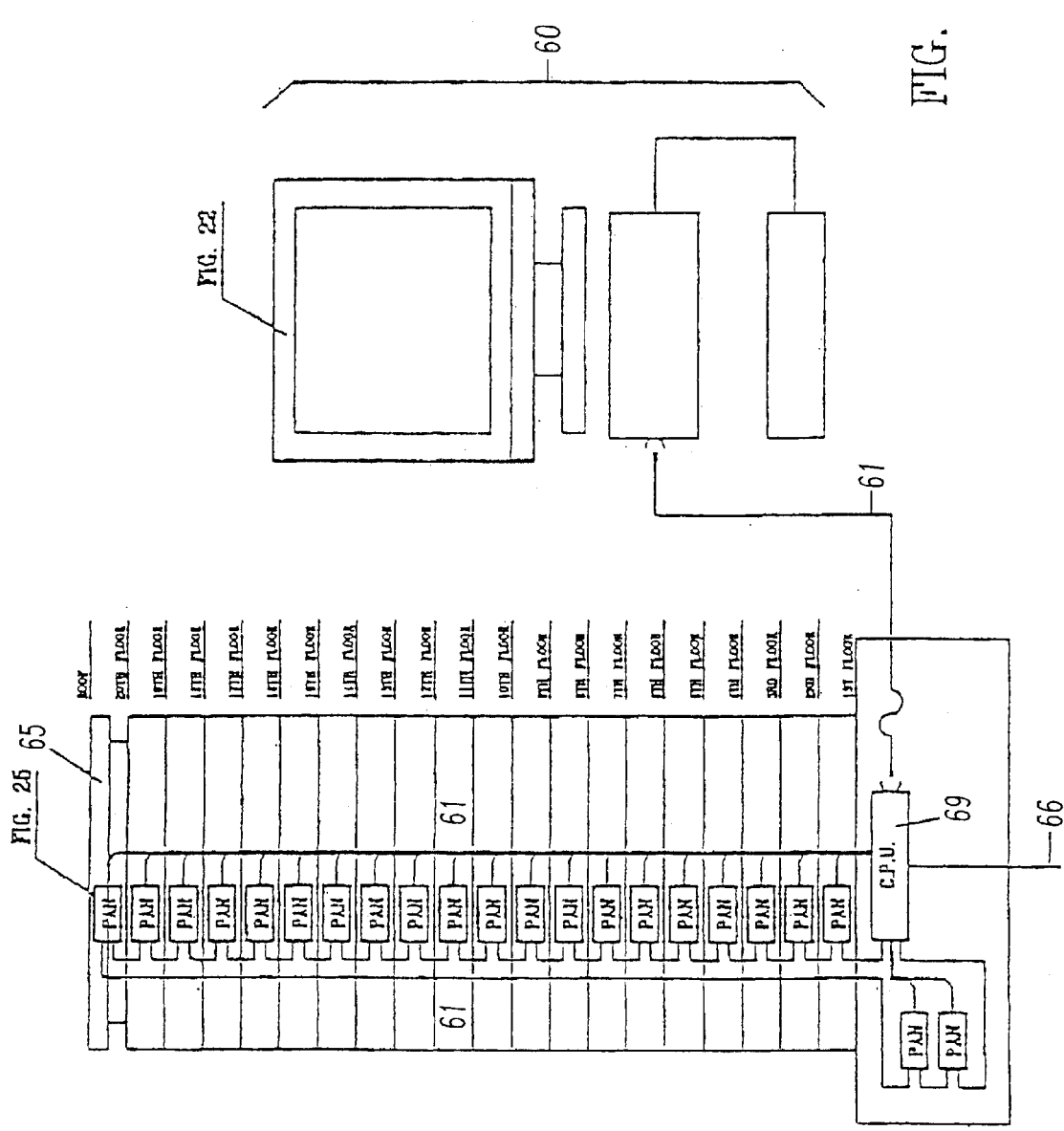

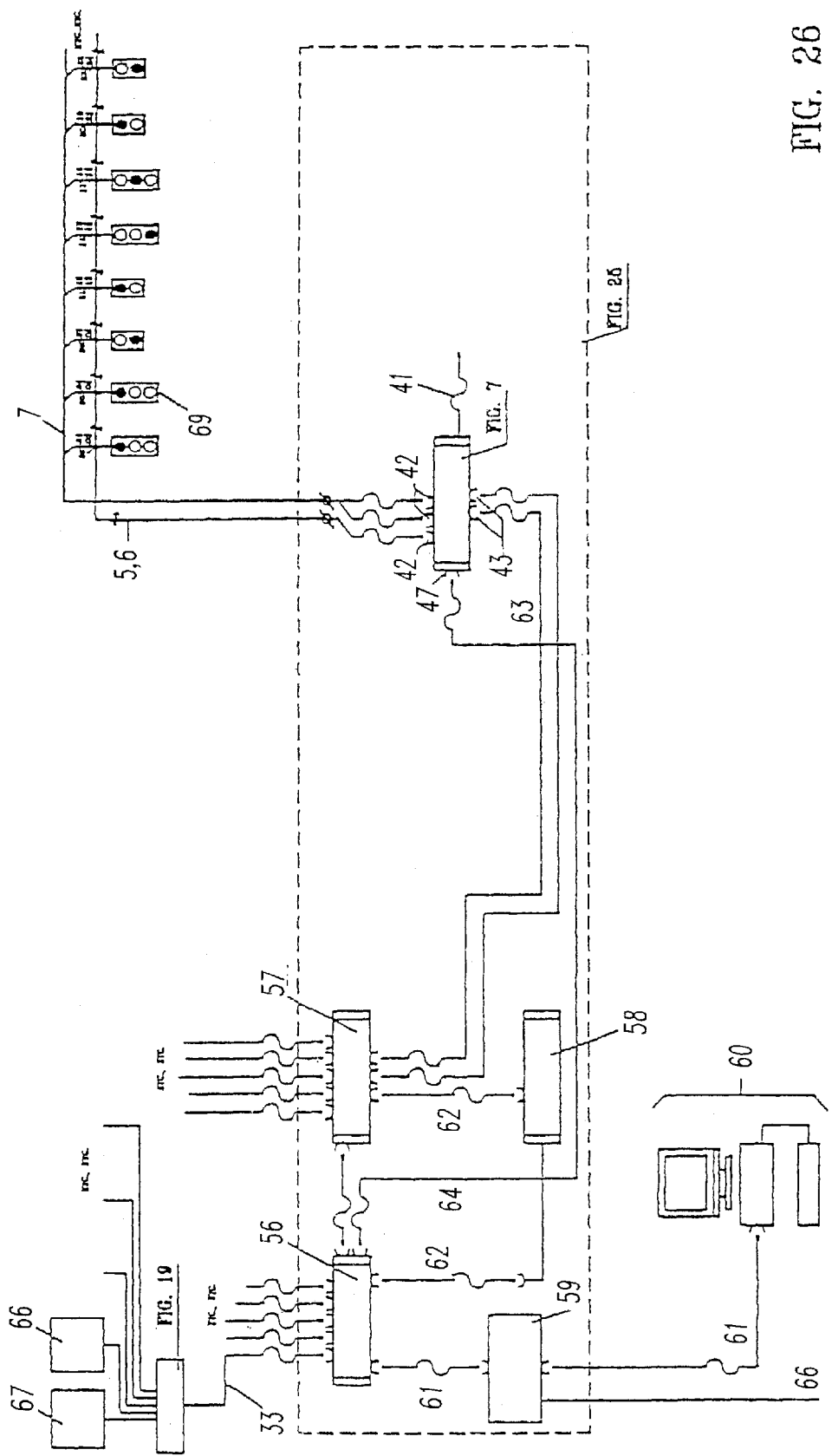

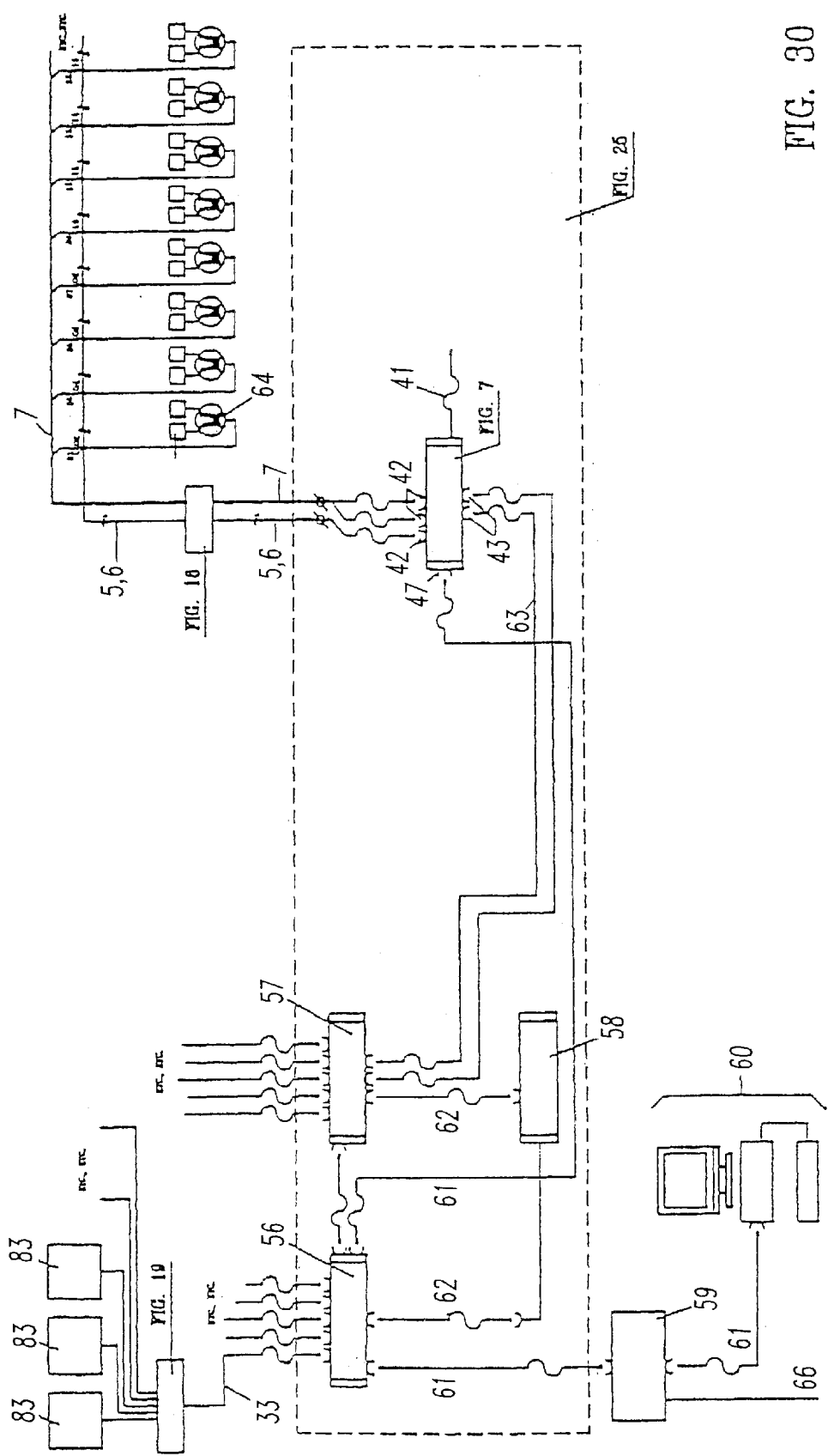

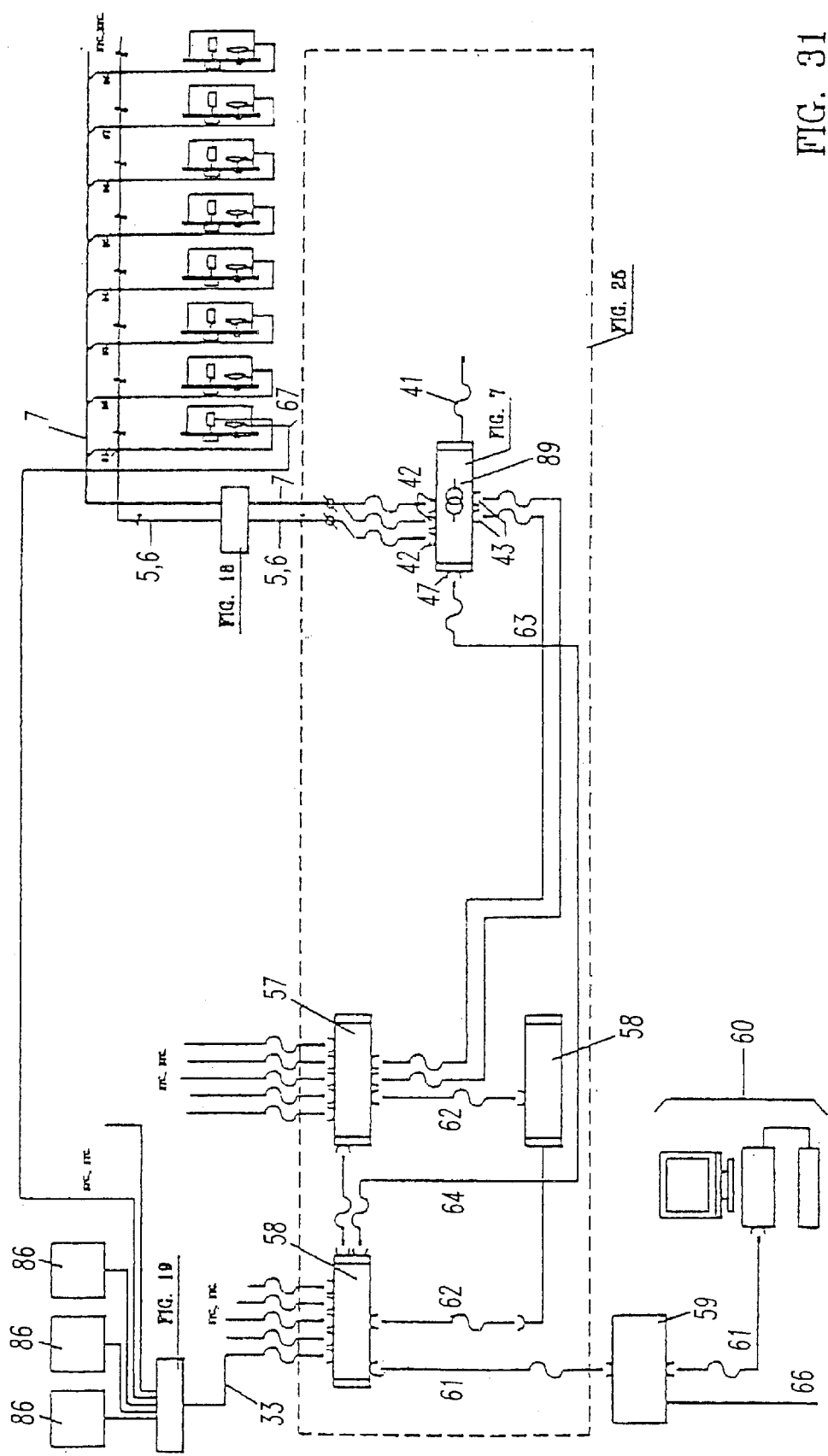

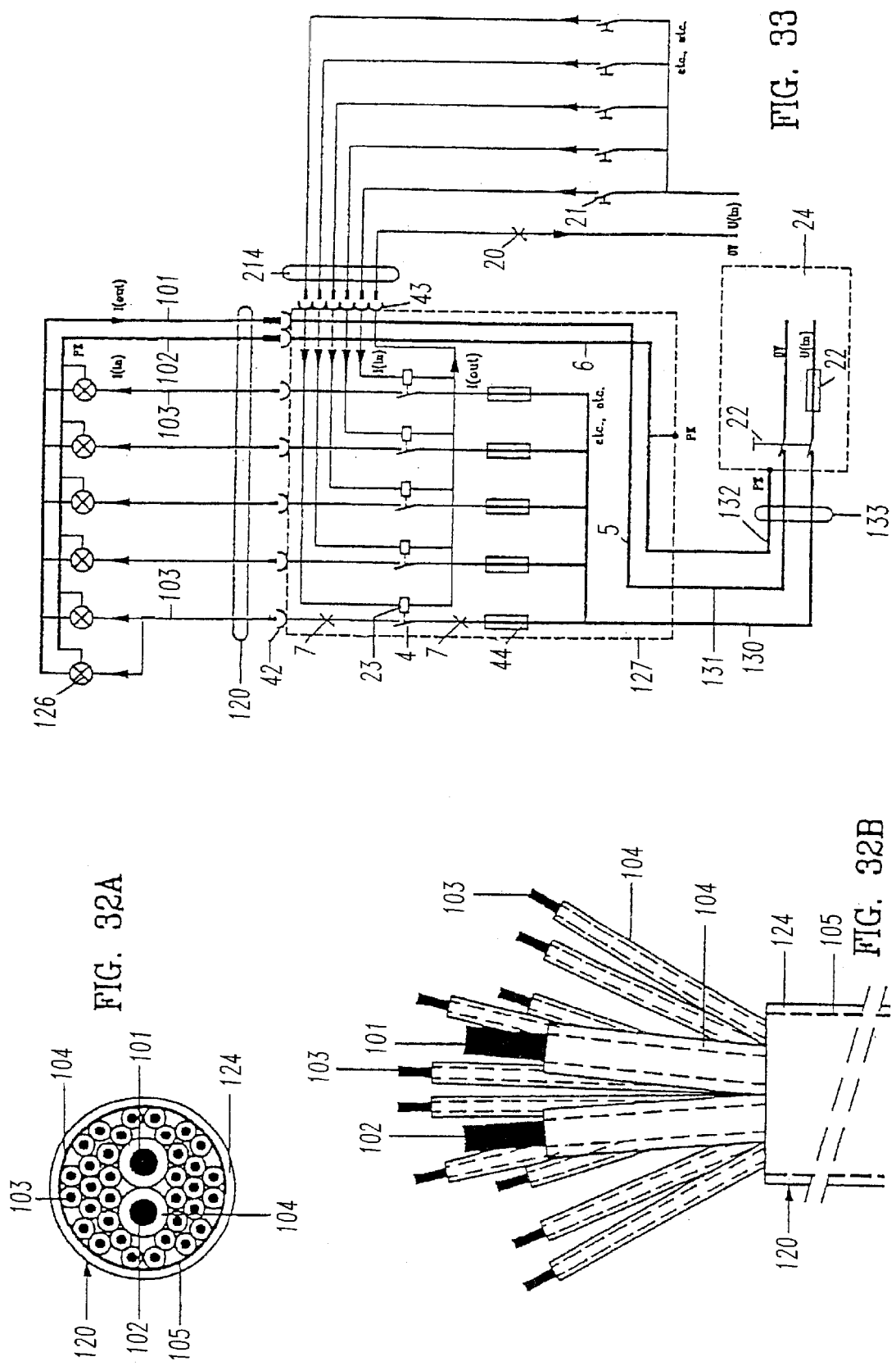

CIRCUIT FOR SELECTIVE POWER SUPPLY TO ELECTRICAL UNITS

BACKGROUND OF THE INVENTION

A circuit is known for selectively providing electric supply voltage from an input feed line with a neutral conductor and a phase conductor to individual or parallel-connected groups of connected terminals each comprising a phase core and a neutral core, to which electrical units using electricity, for instance light fittings, are or can be connected. A known circuit comprises a neutral connection between the neutral conductor and each neutral core and a phase connection between the phase conductor and each phase core. It is further known to include in each phase core a switch, using which the relevant electrical unit or group of electrical units can be switched on and off. An end group of a switching and distribution device having electrical units connected thereto is herein protected by an overcurrent protection element which is accommodated in a switching and distribution device, wherein the cross-sectional surface of the phase cores and the neutral cores to the electrical units is adapted to the associated overcurrent protection element. This means in practice that, in the case where a plurality of electrical units are connected to an end group, the cross-sectional surface o the phase cores to the electrical units are therefore considerably overdimensioned.

An example; a number of lamps with a power of 100 W at 230 V_is connected to an end group of a switching and distribution device, wherein the cross-sectional surface of the phase cores and the neutral cores of the installation of the relevant end group is adapted to the overcurrent protection element of the end group in the switching and distribution device, wherein the maximum permissible current amounts for instance to 16 A. By way of comparison it is noted chat the current of each of said 100 W lamps amounts to less than 0.5 A.

In respect of the above described circuit system there are switching systems which are microprocessor- controlled and which find application in various types of building.

The first group of known systems are designed in accordance with decentralization principles and comprise a collection of decentralized control, feed and switching modules which are arranged above lowered ceilings and to which electrical units, for instance light fittings, can be individually connected. These modules are mutually coupled by means of a collection of data-bus lines which are in turn connected to a centrally deployed central control unit or CPU (Central Processor Unit). Operation of the lighting herein takes place either locally by means of signal media or centrally by means of control panels or a personal computer on the basis of a computer program.

A second group of known systems is likewise designed in accordance with decentralization principles wherein control and feed modules are placed above lowered ceilings and the switching device is incorporated in an electrical unit, for instance a light fitting. Coupling and operation take place in accordance with the description as given above for the first group of known systems.

A third group of known systems is designed in accordance with decentralization principles wherein the control modules are incorporated in the switching units and the feed and switching modules are arranged above lowered ceilings. Coupling and operation take place as stated in the description for the first group of known systems.

The described systems have for their object to simplify the installation of the systems by saving on the amount of cabling.

A fourth and final group of systems is designed in accordance with centralized principles. These systems are little used however, since heretofore the design of the distribution structure has not been sufficiently tested. Systems according to such a principle, in as far as they already exist, are therefore still much too expensive at the moment.

The first three stated, known decentralized systems have the Following drawbacks:

(1) An architect is a person who designs a building and therein makes use in many cases of lowered ceilings. These ceilings can be removable or non-removable. The architect is in practice always the one who makes the decisions in respect of the type of lowered ceiling which must be placed in a building. The technical aspect plays a subordinate role here. Two types of lowered ceiling are used, i.e. so-called removable and non-removable ceilings. In the case of removable ceilings the problem occurs that, if a problem arises with the decentralized equipment above the ceiling, these ceilings must officially be removed by a building contractor, since this falls within his responsibility. In the case of non-removable ceilings (for instance plastered ceilings), the problem arises that, when a problem occurs with the decentralized equipment above such a ceiling, this means demolishing thereof, which may be disproportionally costly. For the solving of a problem with the electrical installation the user of these installations is thus wholly dependent in these cases on the building contractor, which is an extremely unusual and very undesirable situation. In the best case it could be said that the service access to the installation merits special interest.

(2) Integration of control switching modules into components such as light fittings and switching units has the drawback of dependence on the manufacture. If a choice is made for a particular switching system, the use of fittings and switching units from the same manufacturer is also obligatory. This conflicts with the aspiration to have the greatest possible freedom in respect of choice of manufacturer of the components for installing, irrespective of the manufacturer of the switching system to be chosen.

(3) Decentralized installations become unfathomable after a period of time because over the years feed and switching components may gradually be added fairly randomly, and in practice this is never kept up to date in diagrams and modification data.

There is the further drawback that the operation of such systems or the manner in which the various parts are coupled and interconnected is not clear to the user of the installation. This has its origin inter alia in the typical knowledge level of the user in respect of such often "intelligent" components. The problem of serviceability also arises here once again.

(4) Decentralized control, feed and switching modules can often only be connected with much effort, for instance bus cable in, bus cable out, feeder cable in, switched lines out, control lines of signal media in. Such modules are also placed above ceilings in large quantities, wherein said operations must take place for each module individually. A large number of junctions thus result, the laborious nature of the connection thereof usually being underestimated.

(5) PLC (Programmable Logic Control) or microprocessor-controlled, intelligent control components are susceptible to obsolescence, similarly to computers, while installations are written off over a longer period, for instance in the order of 15 years. This means that a user of an installation must have the option of adapting the control engineering every few years to new technologies while maintaining the basic installation. With locally placed, intelligent components the complete installation must be modified, and this is expensive.

The conclusion which must be drawn from the above stated five drawbacks is that control, feed and switching equipment must at all times be placed at a location where it is easily and freely accessible to enable service provision in simple manner, for instance in one or more technical areas and certainly not above lowered ceilings, let alone in fixed ceilings. Switching devices and control device must also be made disconnectable to enable easy replacement of the control devices at a desired moment, wherein a simple centralized feed, switching and control wiring circuit must be developed to make the installation design easily controllable. The design of the entire installation must necessarily be recorded herein for the management thereof.

It is an object of the invention to substantially improve the intrinsic safety of the above described known circuit and to provide the option of installing the circuit at considerably reduced cost.

It is a second object of the invention to modify the known circuit such that it can be adapted in very flexible manner, making use of modular units, to individual requirements determined by the circumstances, with the possibility of easy adaptation of a circuit, once installed, to new requirements.

It is a third object of the invention to design the circuit such that it is easily controllable, wherein switching control components are easy to exchange, replace and monitor, wherein the effective useful life of the static components, among which can be included the wiring and cabling components, can be considerably increased.

A fourth and final object of the invention is to a body a switching system such that full synergy can result between optionally used data control systems, switch engineering, safety technology and energy distribution for electrical units.

SUMMARY OF THE INVENTION

In respect of the above stated objectives the invention generally provides a circuit for selectively providing electric supply voltage from an input feed line with a neutral conductor, a phase conductor and optionally an earth conductor to individual or parallel connected groups of connected terminals each comprising a phase core, a neutral core and optionally an earth core, to which electrical units using electricity, for instance light fittings, are or can be connected, which circuit comprises:

a neutral connection between the neutral conductor and each neutral core;

optionally an earth connection between each earth conductor and each earth core;

a phase connection between the phase conductor and each phase core, in which phase connection is arranged a current control element; and an overcurrent safety element, for instance a fuse, which is incorporated in each phase connection and which limits the current to the maximum value determined for the relevant phase connection.

It is noted that optionally at least one earth conductor can be added to the circuit.

An example of such a circuit is embodied such that the current control element is a switch or relay.

Another embodiment has the special feature that a current control element is a controller, for instance a thyristor controller.

A very interesting possibility from a cost viewpoint consists of each phase core having a cross-sectional surface adapted to a maximum current through this phase core. This variant has the advantage that cores having considerably reduced cross-sectional surfaces can generally suffice, which provides a great advantage in terms of installation technique, since thinner cores are easier to handle and the possibility is moreover created of reducing the total dimensions of a bundle consisting of diverse cores, whereby more cores can be placed through an installation tube.

In similar manner the invention provides a variant wherein each neutral core has a cross-sectional surface adapted to the maximum current through this neutral core.

Specific advantages are achieved with an embodiment wherein each overcurrent safety element is arranged in the relevant phase connection close to the phase conductor. In this embodiment the advantage is gained that in any unsafe situation, in particular short-circuit, in one or more of the phase cores beyond an overcurrent safety element, a known safe situation is initiated immediately after activating of this overcurrent safety element. When switches are used as current control elements, switch contacts of lighter type can generally also suffice, since the switches no longer have to be adapted to the relatively large maximum current of the known Systems which is allowed in principle, but can be limited to those values, which are compatible with the limited maximum current determined by the relevant overcurrent safety element.

A specific embodiment has the special feature that only the part between the overcurrent safety element and the relevant terminal has a cross-sectional surface adapted to said maximum current through the relevant phase core.

Particular advantages are achieved with an embodiment, wherein the circuit is provided with a central control unit, for instance a switch panel, a PLC, a PC or the like, which is adapted to control the current control elements, for instance under program control with operation on the basis of external instructions, for instance co wands from a keyboard, a mouse, light sensors, warning sensors or the like, for instance according to the program present in the central control unit. Such an embodiment enables a great flexibility in combination with exceptionally great ease of operation.

The latter embodiment preferably comprises a circuit as according to claim 1, comprising a housing in which are accommodated a number of current control elements controllable by the central control unit via respective control terminals, and respective overcurrent safety elements connected in series to said elements, wherein the phase, neutral and optional earth connections are jointly connected to respective poles of a first connector and the neutral connection is connected to a second pole of this first connecting means, which first connecting means is connectable to the input reed line;

a number of chase cores, a neutral core and optionally an earth core are connected to respective poles of a second connecting means, for instance a connector or terminal strip, which second connecting means is connectable to the terminals for the electrical units; and a number of control terminals are connected to respective poles of a third connecting means, for instance a connector or terminal strip, which third connecting means is connectable to the central control unit.

A specific embodiment has the special feature that the second and/or the third connector is coupled fixedly to the housing.

The circuit according to the invention as described above can advantageously be further provided with bypass means for controlling the current control elements without the operation of the central control unit. The system can hereby be controlled in simple manner via the bypass provisions in an emergency situation.

A circuit with a central control unit can advantageously be provided with presentation means, for instance a monitor, with which diverse characteristic figures can be presented, for instance the total power or the total power per group of switched-on electrical units, the number of hours for which an electrical unit has been switched on, the energy consumption over a determined period and the like.

The invention also relates to a module comprising a housing in which are arranged a number of current control elements controllable by the central control unit via respective control terminals and respective overcurrent safety elements connected in series to said elements.

The invention further relates to an electrical cable, which is adapted to form part of a circuit according to the invention, wherein each phase core and each neutral core have a cross-sectional surface adapted to the maximum current through the relevant core. This electrical cable according to the invention comprises:

- a number of insulated cores serving as phase cores and each having a relatively small cross-sectional surface;
- an insulated core serving as neutral core with a relatively large cross-sectional surface;
- optionally an insulated core serving as earth core with a relatively large cross-sectional surface; and
- a jacket connecting and enclosing all said cores.

BRIEF DESCRIPTION OF THE DRAWINGS

The invention will be further elucidated with reference to the annexed drawings. In the drawings:

FIG. 1 shows a diagram of a circuit according to the invention in a first embodiment;

FIG. 2 shows a diagram of a complicated circuit according to the invention;

FIG. 7A shows a top view of a DEPS module;

FIG. 7B shows a front view of the DEPS module according to FIG. 7A;

FIG. 20 shows an example of a schematic structure of an installation part indicating the diverse components as shown in FIG. 1–19.

FIG. 21 is an example of a data network structure of a determined building;

FIG. 26 shows an example of a traffic light installation according to the invention;

FIG. 30 shows a schematic diagram of a sun protection installation on the basis of a circuit according to the invention;

FIG. 31 shows a schematic diagram of a door operating installation on the basis of a circuit according to the invention;

FIG. 32A shows a cross-section through an electrical cable according to the invention;

FIG. 32B shows a side view of an end part of such a cable; and

FIG. 33 shows a diagram of a circuit according to the invention in which the electrical cable according to FIG. 32 is shown.

In the description following hereinafter of the annexed figures, corresponding components are always designated when applicable with the same reference numerals.

DESCRIPTION OF THE PREFERRED EMBODIMENTS

Figure 3:
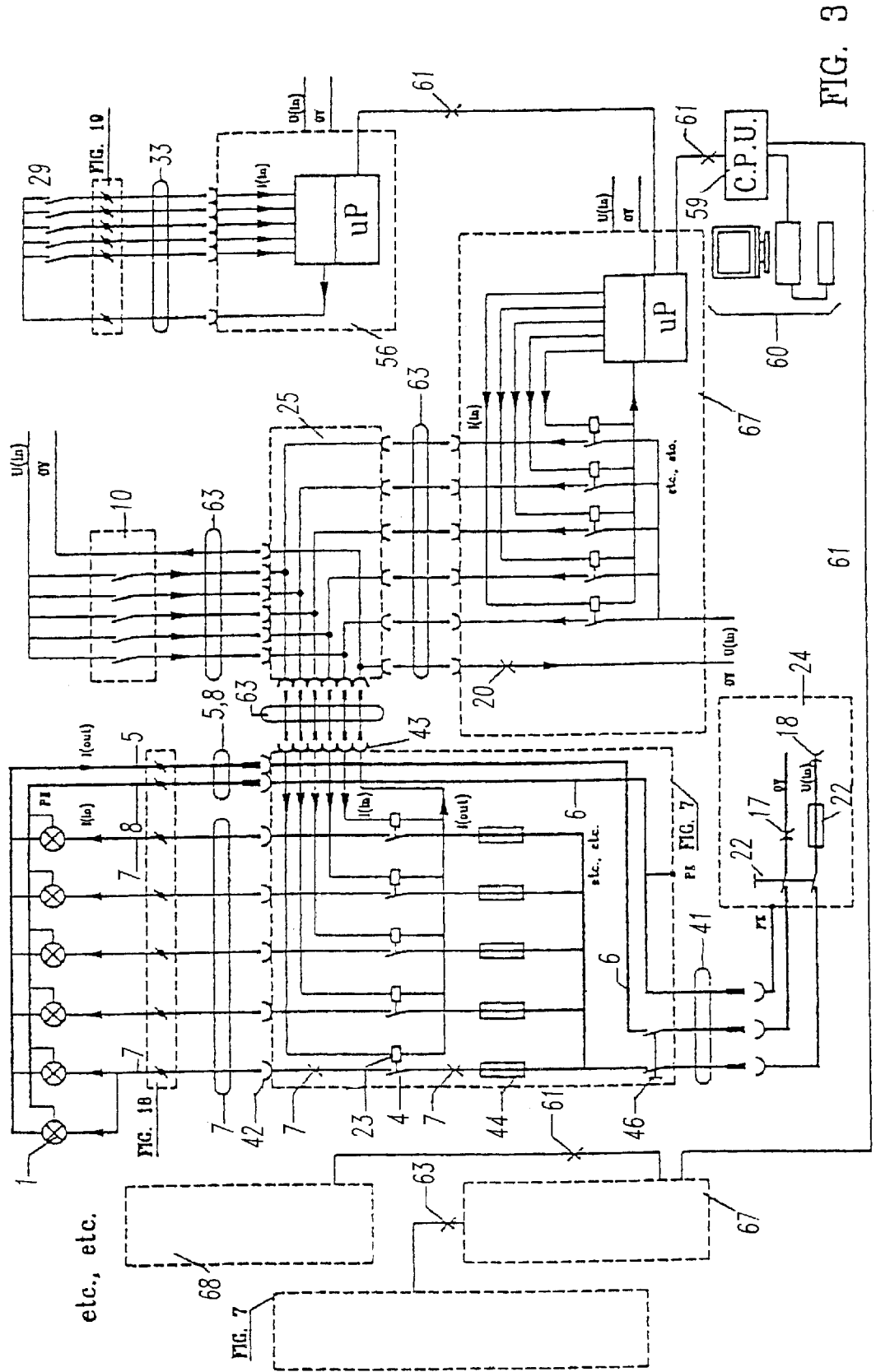
FIG. 3 shows a diagram of a microprocessor-controlled circuit according to the invention.

FIG. 1 shows an example of a simple control current diagram of electrical units 1 which are connected by means of live conductors 7, the diameters of which are adapted to fuses 44, and a central neutral conductor 5. The electrical units are switched by means of hand-operated switches 21. The entire installation is connected to an end group of a switching and distribution device 24 in which are situated for instance a group switch with main fuse 22 and a main live conductor 16 and neutral conductor 17. It is noted that in FIG. 1, and also in a number of the figures following hereinafter, the cross-sectional surfaces of the diverse conductors are represented with relatively thick or-relatively thin lines. This indicates symbolically that the thick lines correspond to cores with a relatively large cross-sectional surface, while the thin lines correspond to cores having a relatively small cross-sectional surface.

Attention is further drawn to the fact that the electrical units drawn in FIG. 1, which are designated as lamps, are connected from left to right respectively as a group of two lights connected in parallel and as individual lamps. It will be apparent that any desired combination is in principle possible.

FIG. 2 shows an example of a more extensive control current diagram of electrical units 1, which can be switched remotely by making use of relay 23 with relay contacts 4 acting as switches which are connected by means of control current wiring 20 to remotely placed switches 21, which are manually operable and are incorporated for instance in a central operating panel. In FIG. 2 the components as according to FIG. 1 are designated with the same reference numerals. Insofar as applicable, this is the ease for all drawings.

FIG. 3 shows an example of a complex control current diagram of electrical units 1 which are connected to a number of so-called DEPS modules (see also FIG. 7). The designation DEPS is an abbreviation of Differentiated Electric Power Switch. The diverse components in the modules are shown in FIG. 7. The DEPS modules are connected to an end group of a switching and distribution device 24. The electrical units can be actuated by either an output module 57, which is in turn connected using a data signal cable 61 to a Central Processor Unit 59 with personal computer 60, and/or a signal input unit 56 with signal media, in this case pulse push-buttons, connected using a control current signal cable 33. The electrical units can be actuated by using a so-called Splitter module 25, on which input voltages from an emergency control panel 10 and input voltages from the voltage output modules 57 are brought together for interconnection with the DEPS module. The purpose of this design is co switch electrical units on and off using microprocessor technology and by making use of one or more emergency control panels. These emergency control panels and the voltage output modules are mutually coupled via one or more Splitter modules 25 via control current cables 63 and connected to a connector chassis part 43 of a DEPS module (FIG. 7).

Figure 4:
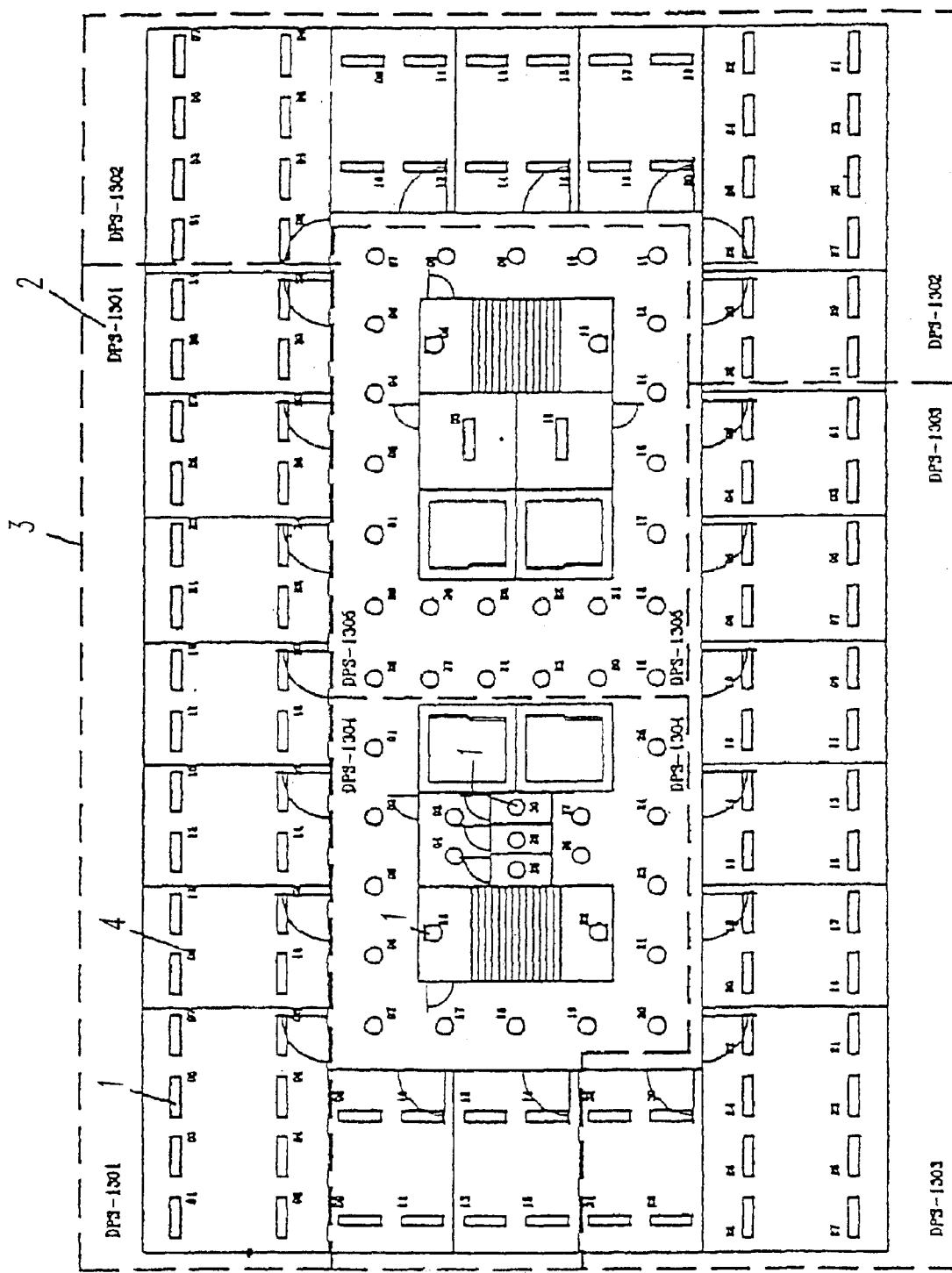
FIG. 4 is an example of a floor plan of a storey showing diverse light fittings.

FIG. 4 is an example of a storey floor plan showing diverse light fittings 1, which can be fixedly or releasably connected by means of electric connections to a DEPS module 2 which is designated with the code DEPS 1301 and is described below. The collections of light fittings designated by the border 3 can be connected thereto. FIG. 4 also shows examples of relay contact codes 4 behind which light fittings can be connected. The remaining floor plan drawings with installation provisions which form part of FIG. 4 are shown in FIG. 5 and FIG. 6.

Figure 5:
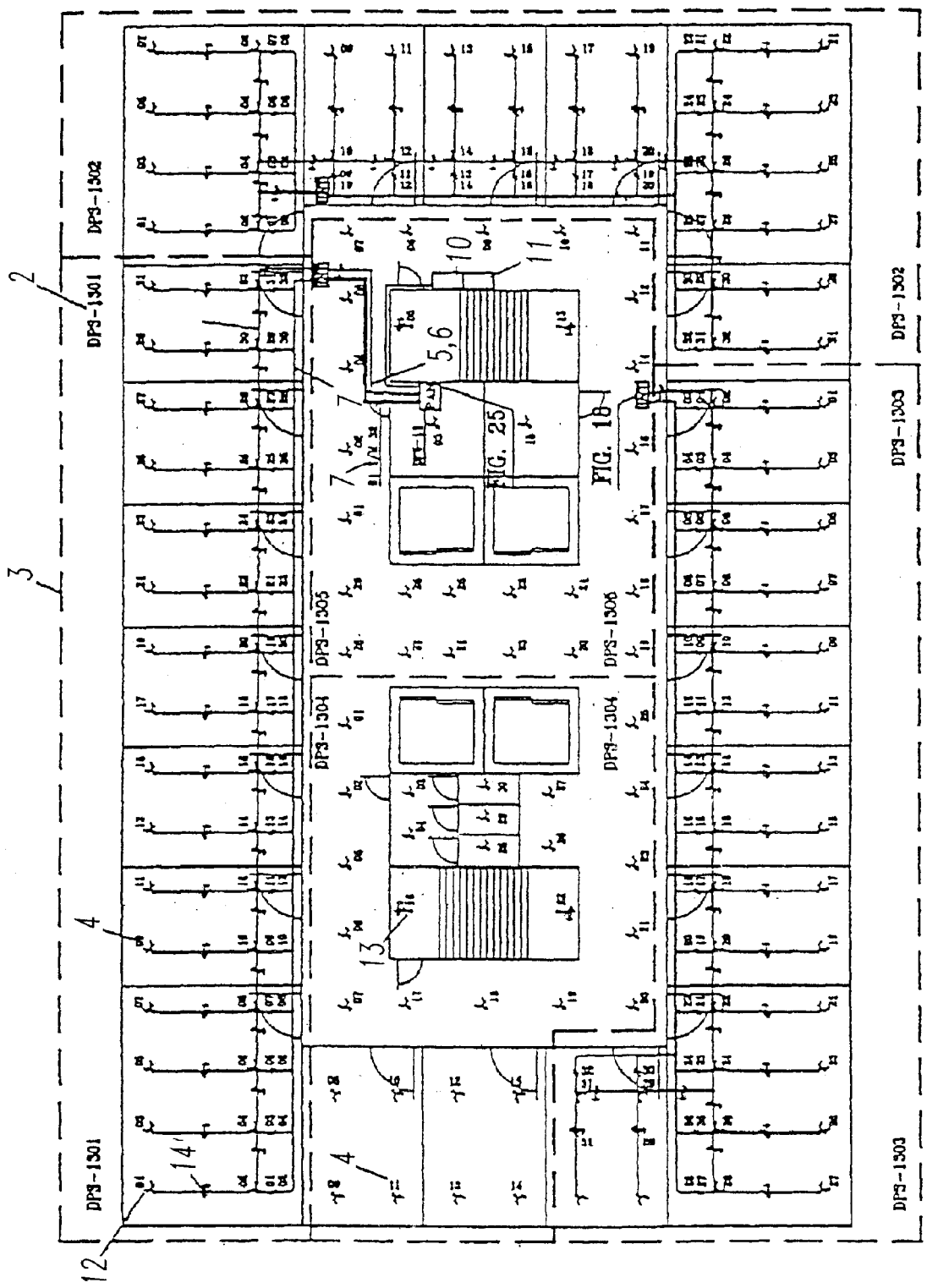
FIG. 5 is an example of a floor plan of a storey showing a part of a low-voltage installation.

FIG. 5 is an example of a storey floor plan on which a part of a low-voltage installation is drawn. This drawing shows the neutral conductors 5 and earth conductors 6 to which a collection of electrical units, in this case light fittings, can be connected. For the purpose of voltage supply to light fittings it must be possible for the switched live conductors 7 to be branched separately and they are connected for this purpose to a terminal housing "Interceptor" (see FIG. 18), which is connected in turn to the relevant DEPS module (see FIG. 7), in the multi-unit panel (see FIG. 25) using live conductors 7 and neutral/earth conductors 5, 6. The light fittings are fixedly connected via a, phase conductor and a neutral/earth conductor 14 to a connection point. 13, or are connected to socket 12 by means of a cable and a plug. The light fittings can also be switched outside the control system by making use of an emergency control panel 10 which is fed via a power supply unit 11. Reference is made to FIG. 4 for the position of the light fittings.

The installation of the DEPS modules with the codes DPS-1304 and DPS-1305 is implemented in accordance with the installations implemented as example.

Figure 6:
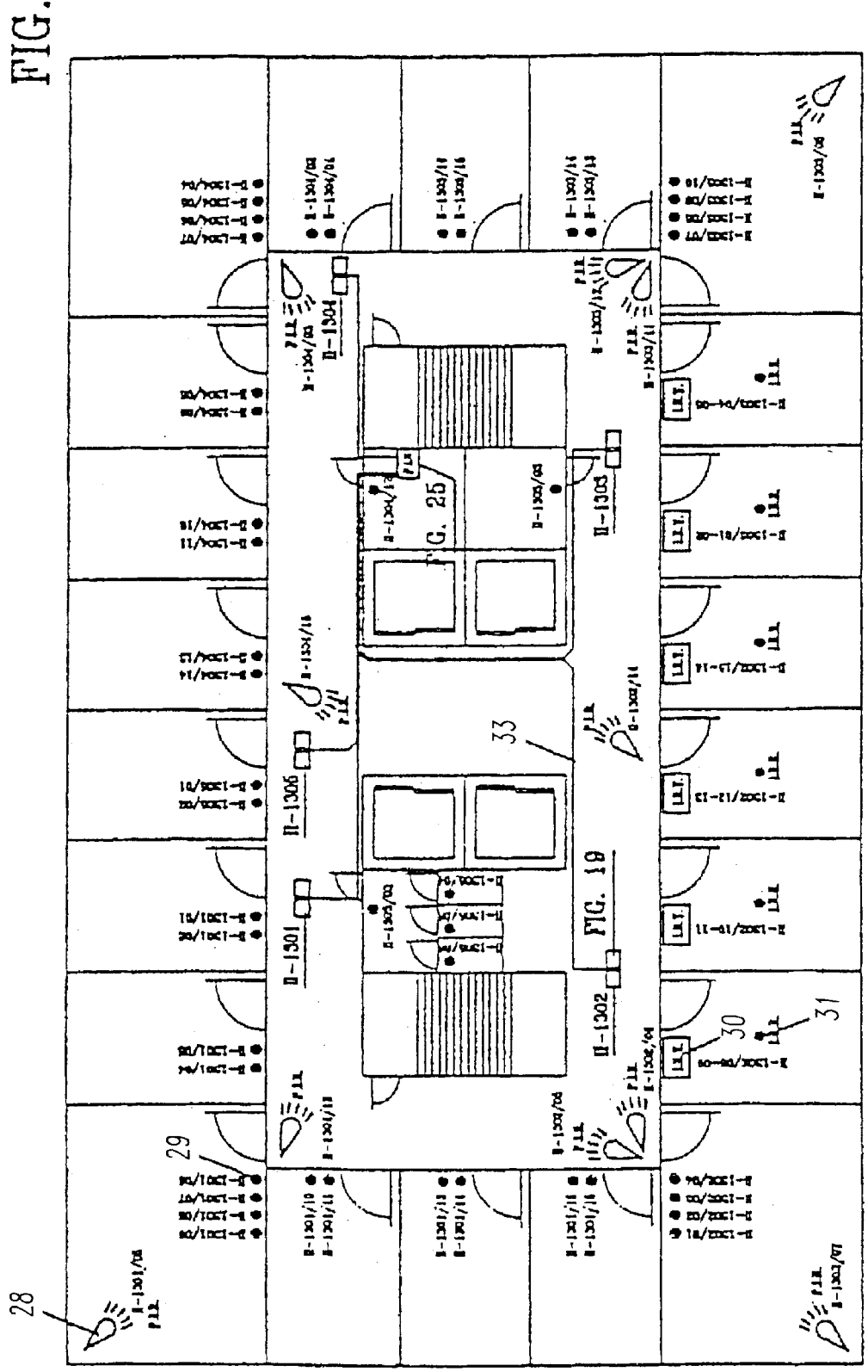
FIG. 6 is an example of a floor plan of a storey showing diverse signal media.
Figure 8:
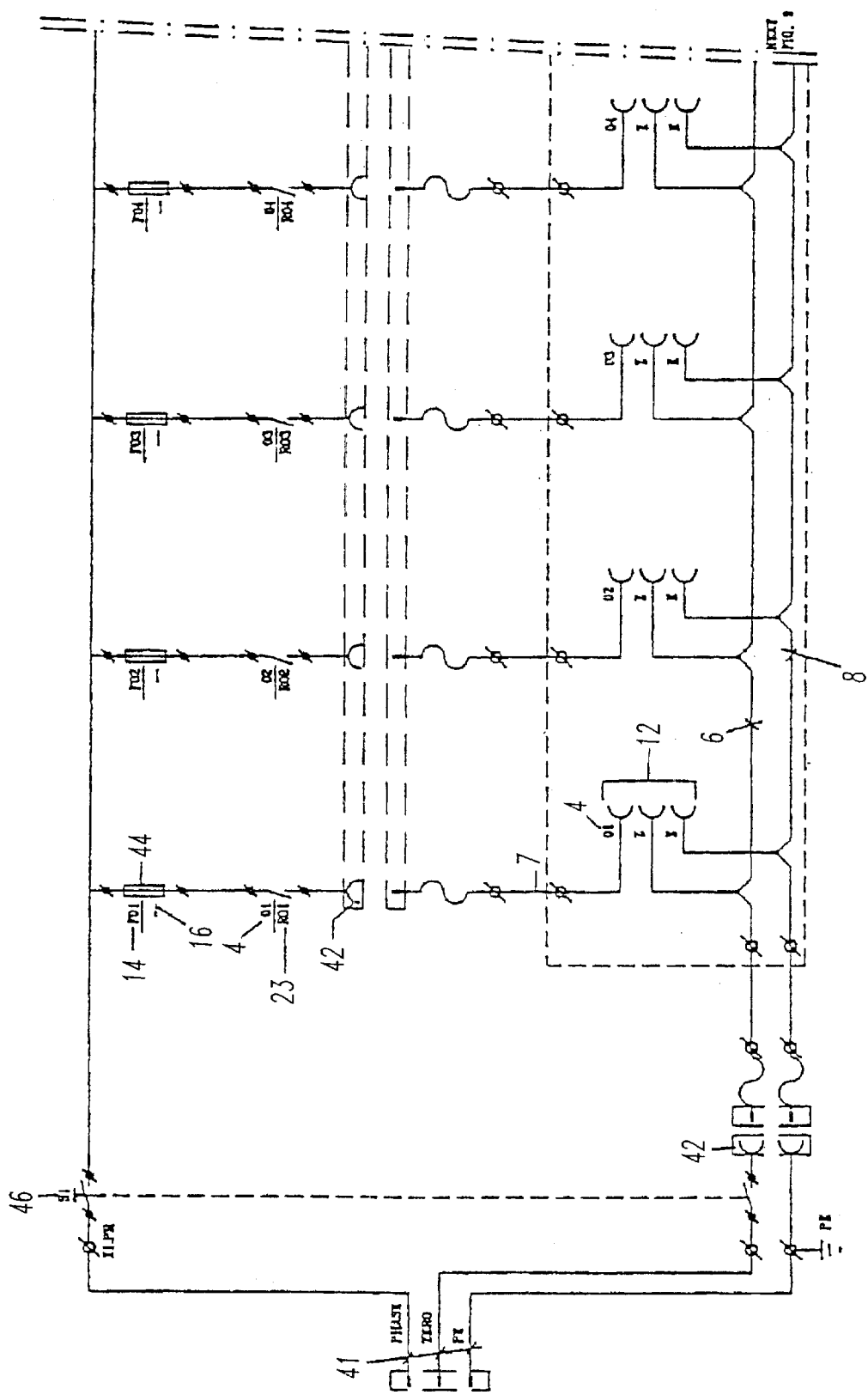
FIG. 8–17 show examples of detailed control current diagrams of a DEPS module.
Figure 9:
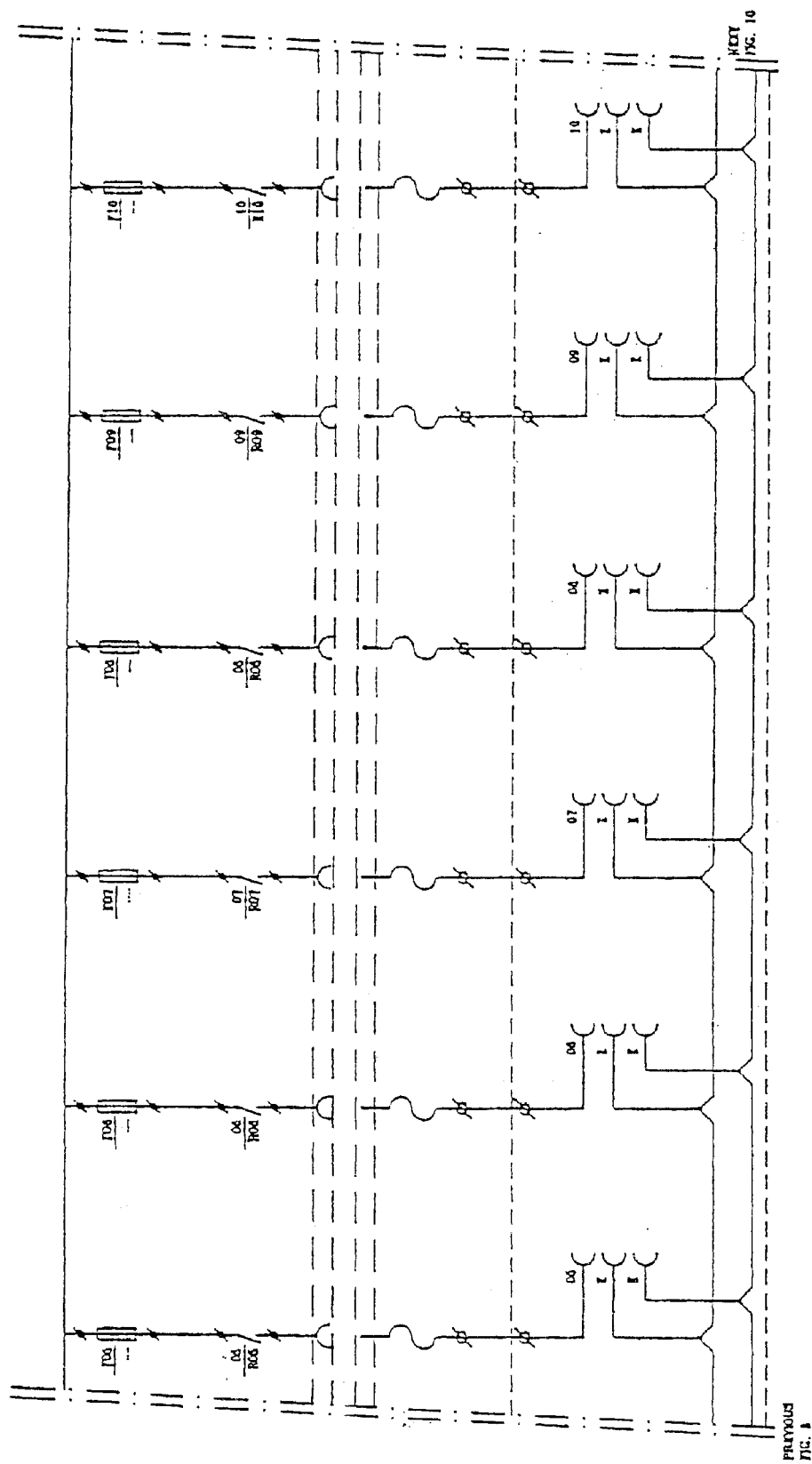
Figure 10:
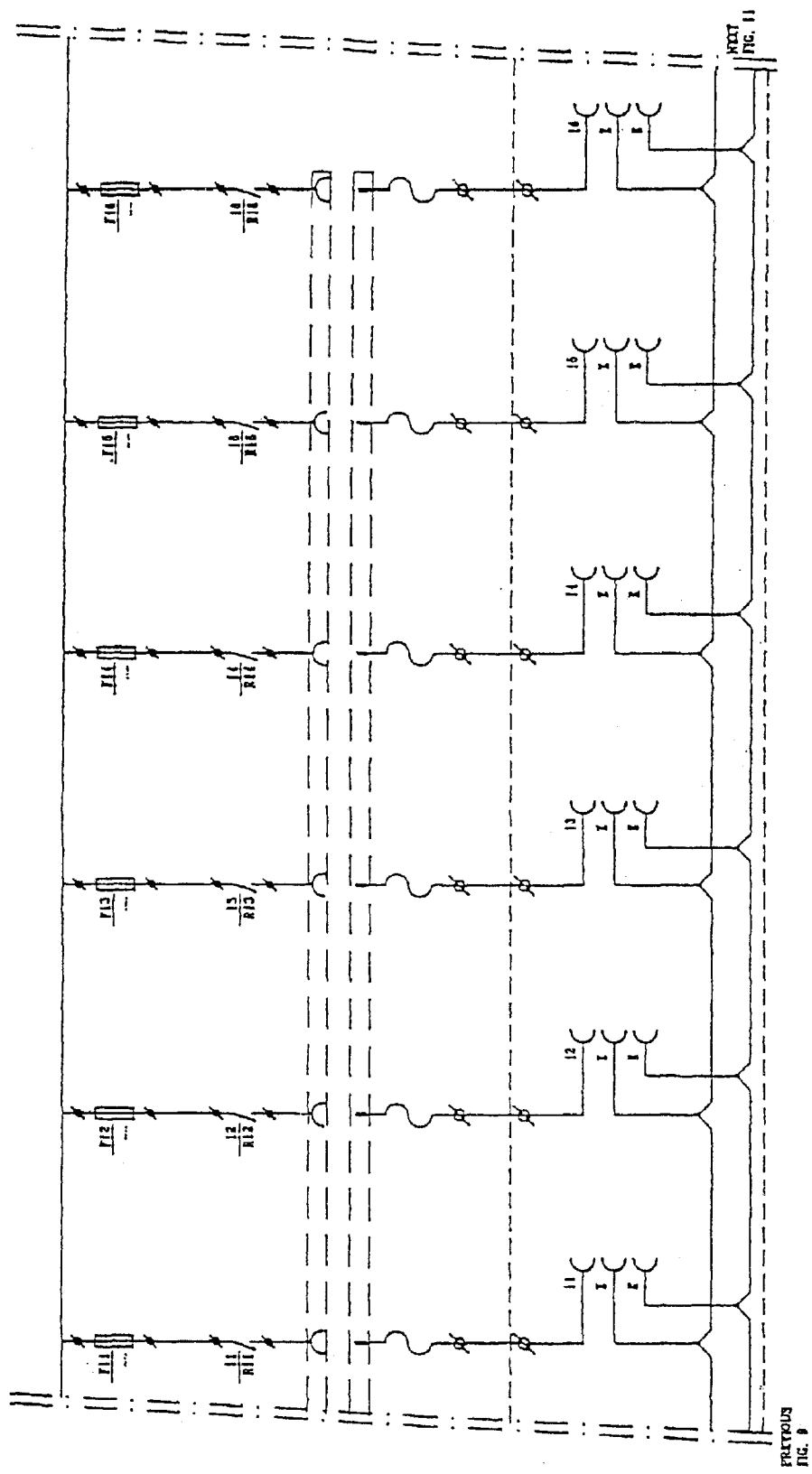
Figure 11:
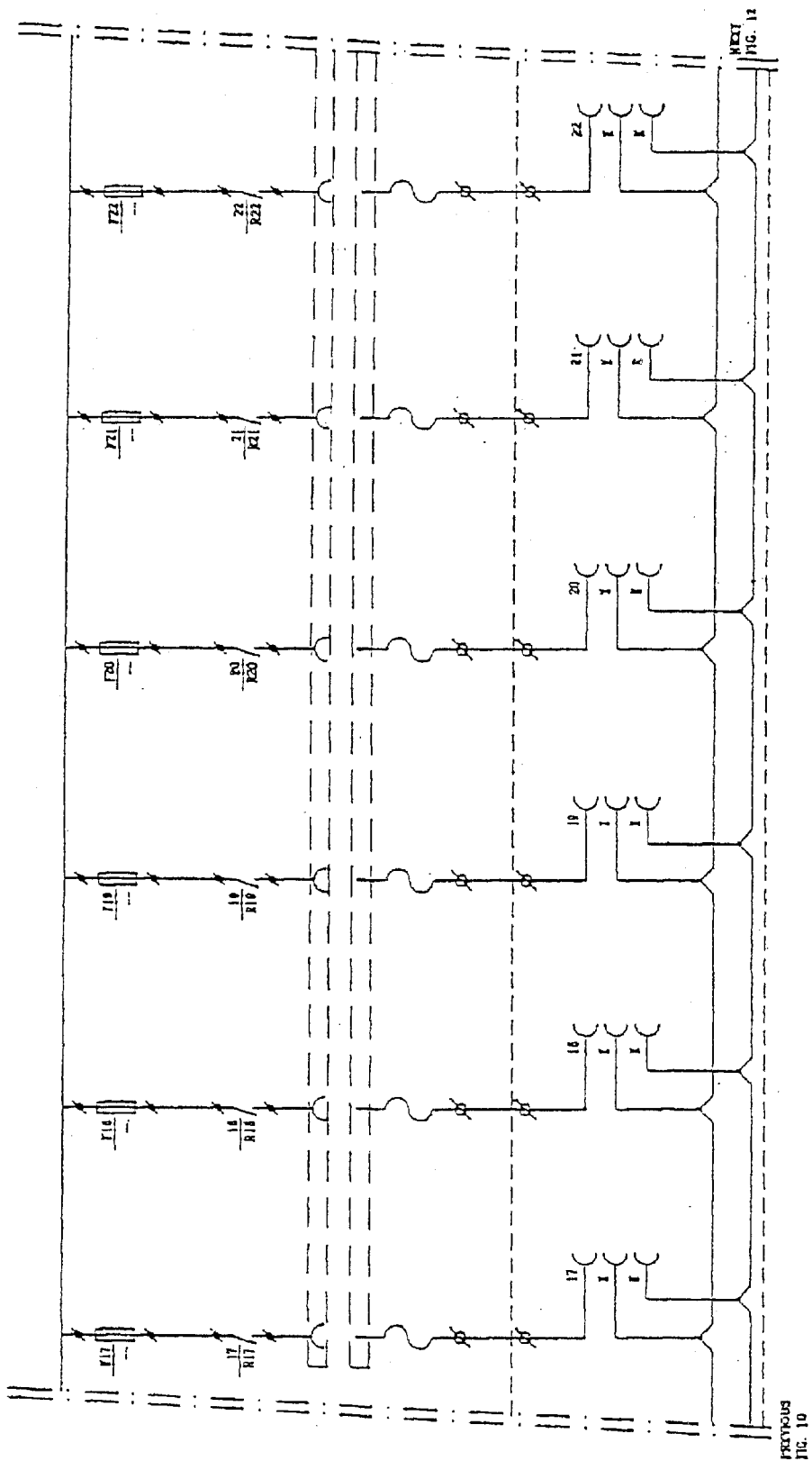
Figure 12:
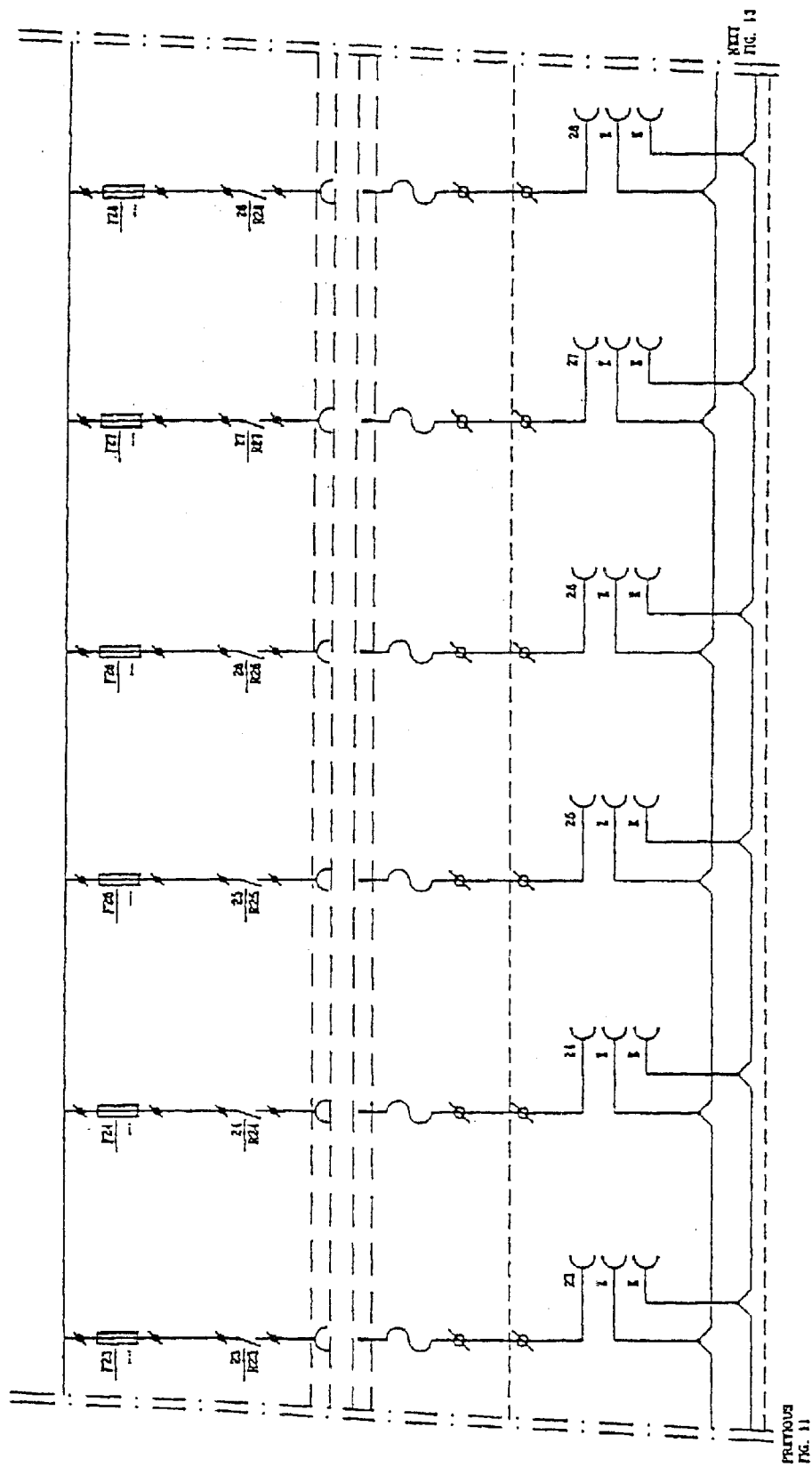
Figure 13:
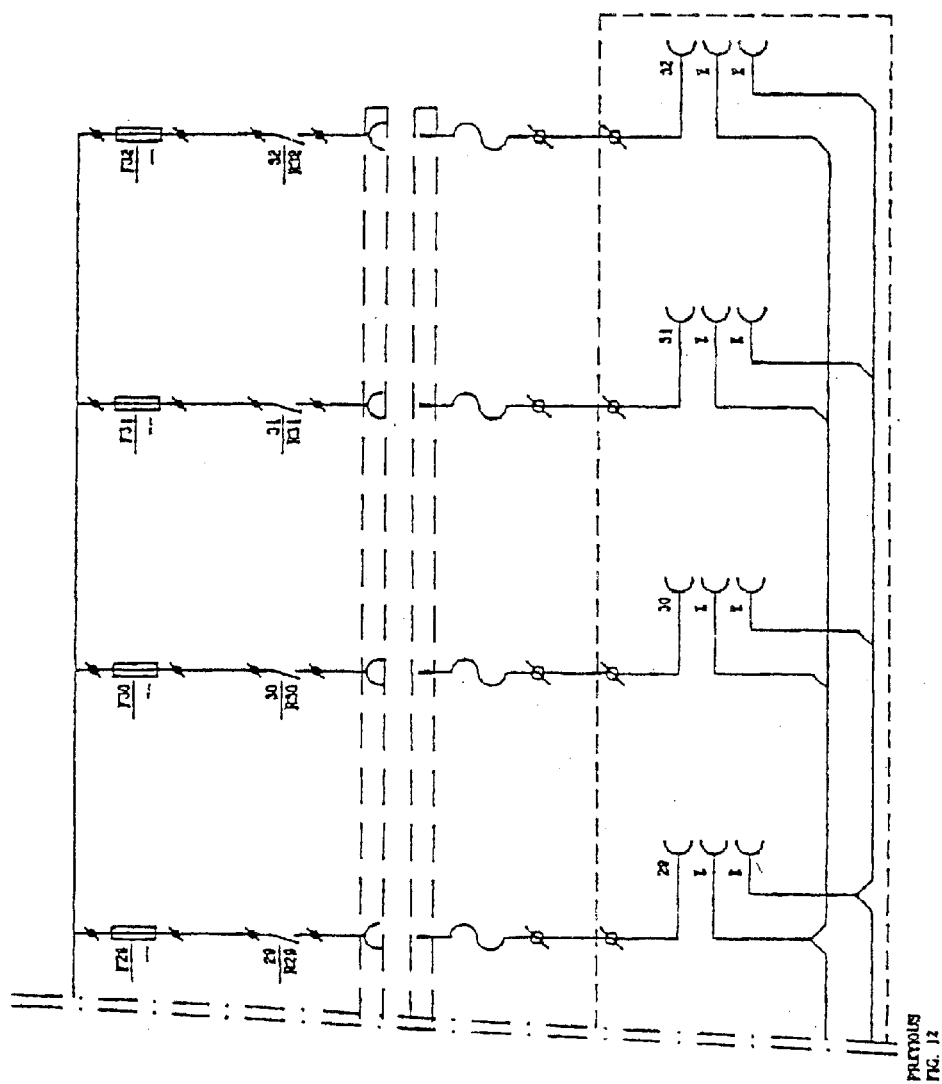
Figure 14:
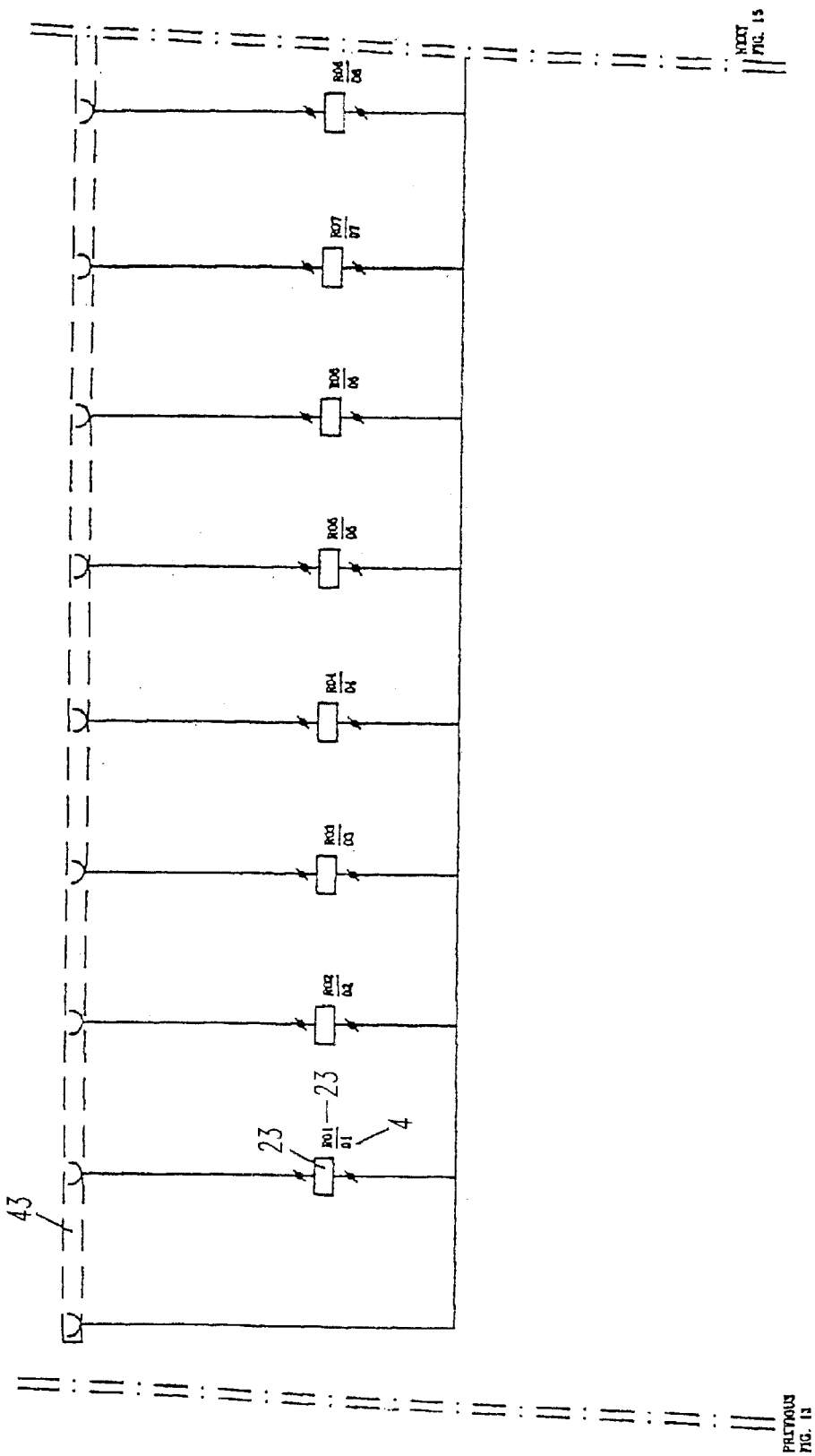
Figure 15:
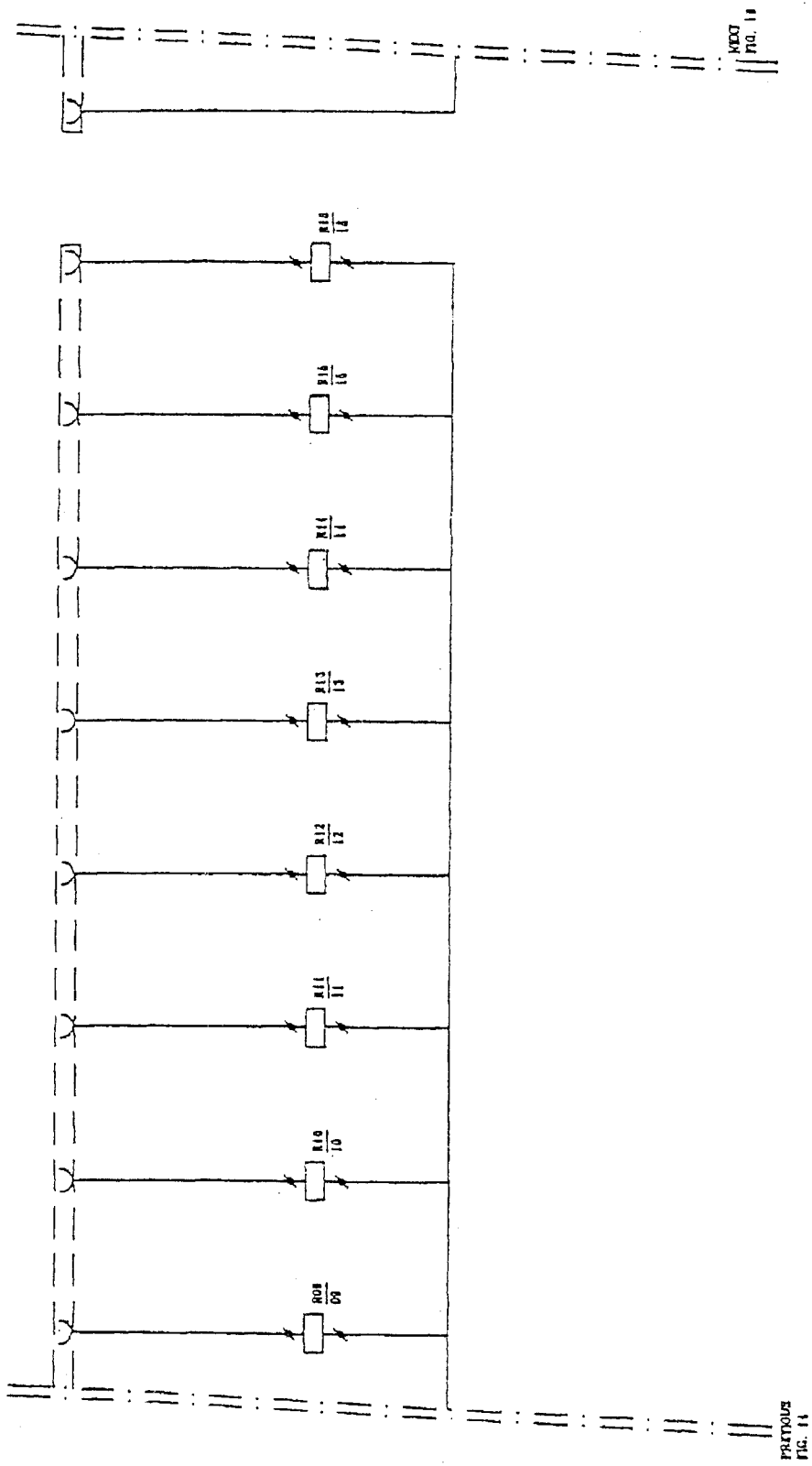
Figure 16:
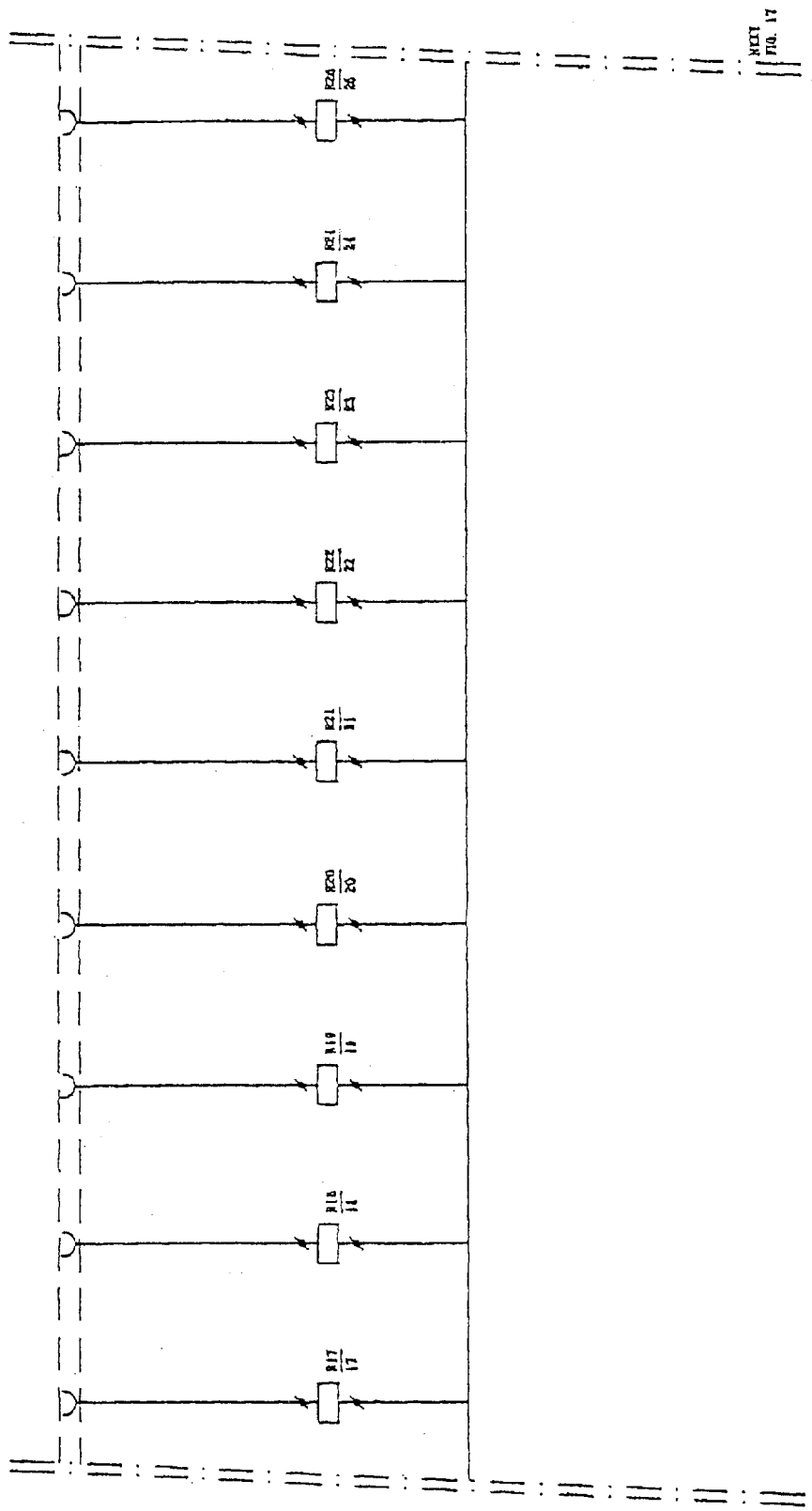
Figure 17:
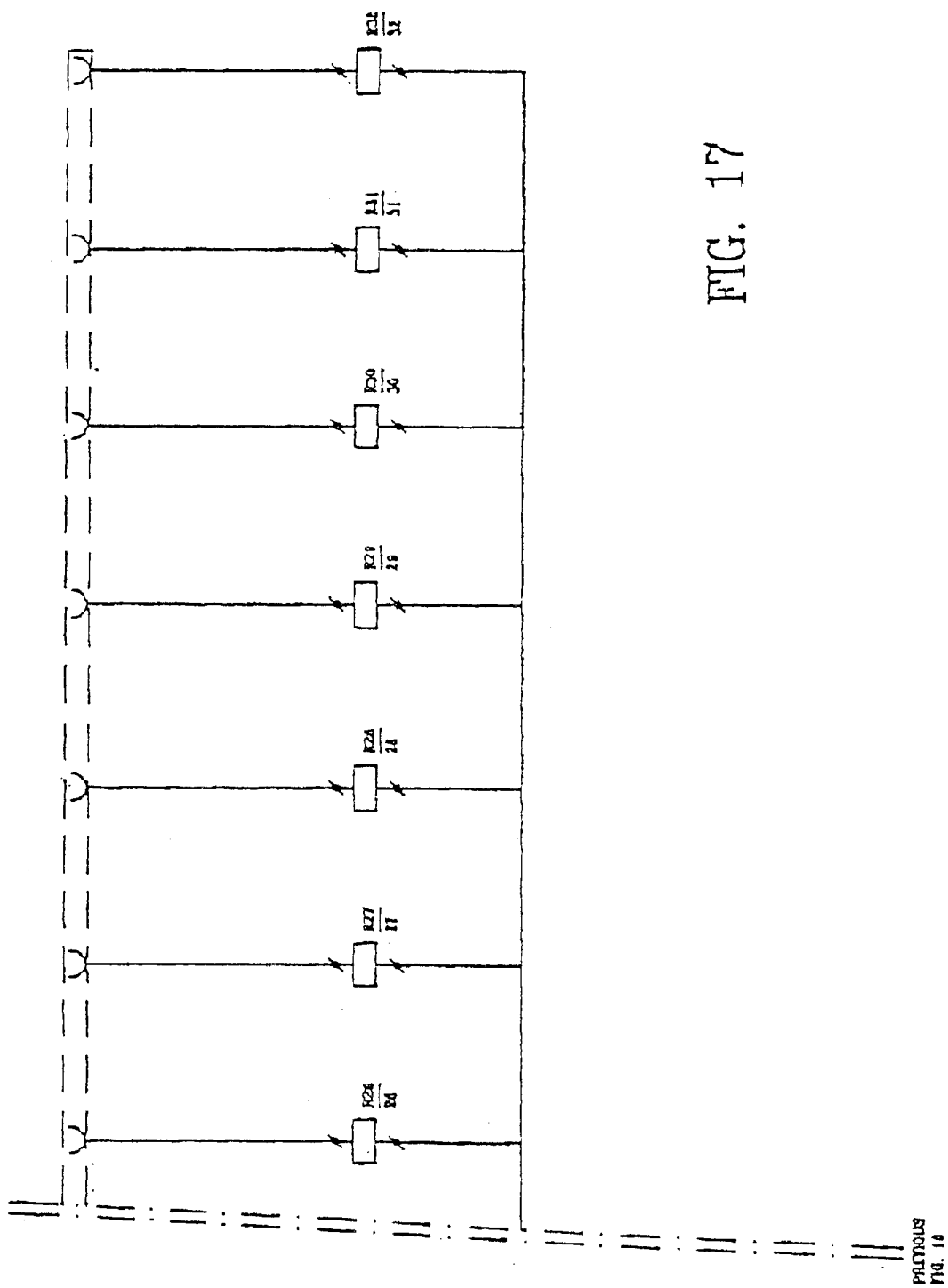

The floor plan drawings with installation provisions forming part of FIG. 5 are shown in FIG. 4 and 6.

The unit 25 is an example of a Splitter module on which input voltages from the emergency control panels 10 with associated power supply unit 11 and input voltages from the voltage output units 57 are brought together for interconnection with the DEPS module. The purpose of this structure is to switch electrical units on and off using a central control unit and via the emergency control panels.

FIG. 6 is an example of a storey floor plan showing the diverse signal media, for instance passive infrared (PIR) detectors 28, pulse push-buttons 29, infrared transmitters 30, infrared receivers 31. These signal media are coupled to an input module which can be accommodated in the multi-unit panel (see FIG. 25), which may or may not be connected via a terminal housing "Input interface" (see FIG. 19) which is coupled to the input, module via a signal cable 33. The floor plan with installation provisions forming part of this FIG. 6 are shown in FIG. 4 and 5.

FIGS. 7A and 7B relate to an example of a DEPS module constructed from the following components: a housing 40 in which the diverse components are accommodated; a mains voltage connecting provision 41; a connecting provision for live switched conductors, neutral and earth conductors (42); a connecting provision for conductors with input voltages for activating relay coils 43; fuses or other types of current-limiting and current-protecting means 44 for individual protection of conductors, relay contacts or electrical units against overcurrent; working switch for making the DEPS module 45 free of voltage and current; warning provisions for safeguarding the system against sabotage 46 with connecting provisions 47. The remaining components form the mounting means 48. The structure according to FIG. 7 is embodied with the above mentioned components. It is however also possible to apply other types of relay, voltage converter, voltage regulators etc. for specific applications of the module making use of the electricity distribution structure as described above.

FIG. 8–17 are examples of detailed control current diagrams of a DEPS module, in which are to be found the components of FIG. 7 with the exception of the anti-sabotage provision 46 and 47.

Figure 18:
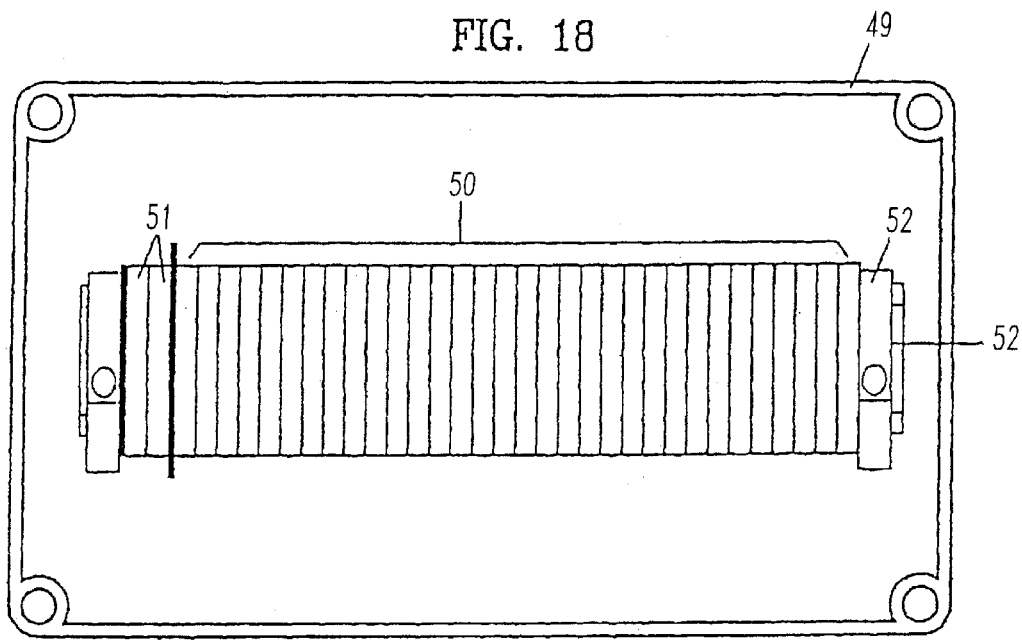
FIG. 18 shows an example of a terminal housing "Interceptor"

FIG. 18 is an example of a terminal housing "Interceptor" with components, such as: housing 49 with terminals 50 for a live conductor, terminals for neutral/earth 51 and mounting means 52 on which a transition takes place from the separated wiring/cabling to a more clustered wiring/cabling.

Figure 19:
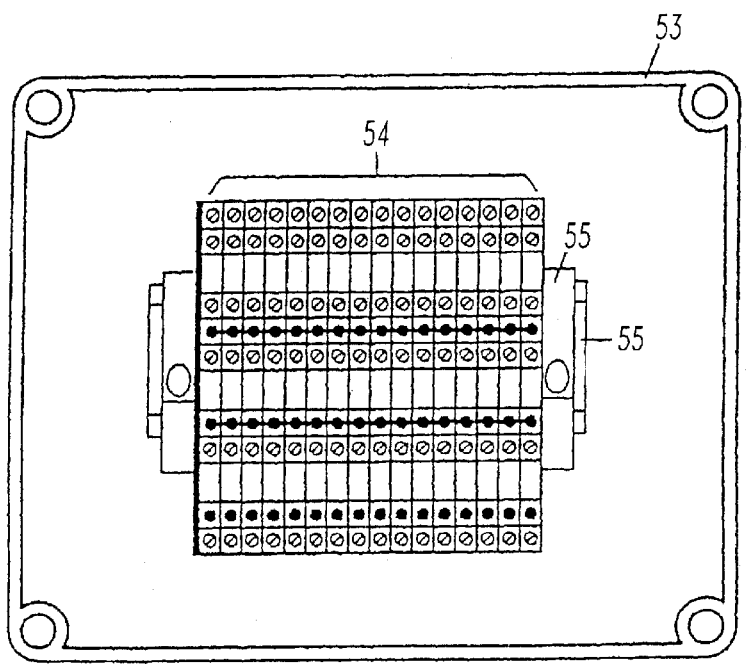
FIG. 19 shows an example of a terminal housing "Input interface"

FIG. 19 is an example of a terminal housing "Input interface" with components, such as housing 53 with terminals 54 and mounting means on which a transition takes place from the separated field wiring/cabling to a sore clustered wiring/cabling.

FIG. 20 is an example of a schematic structure of an installation part showing the components as these are designated in the foregoing FIGS. 1–19, with the exception of the signal input device 56, the control voltage output unit 57, the power supply unit 5 for feeding said units 56 and 57, the central processor unit 59 for programming the system, the associated computer system 60, the data cabling 61, the supply voltage cabling 62, the control voltage cabling 63, the cabling of the optional sabotage contact 64 and the cabling for the purpose of data transmission via the public telephone network 66.

FIG. 21 is an example of data network structure of a particular building 65, in which the components of the above discussed drawings are to be found.

Figure 22:
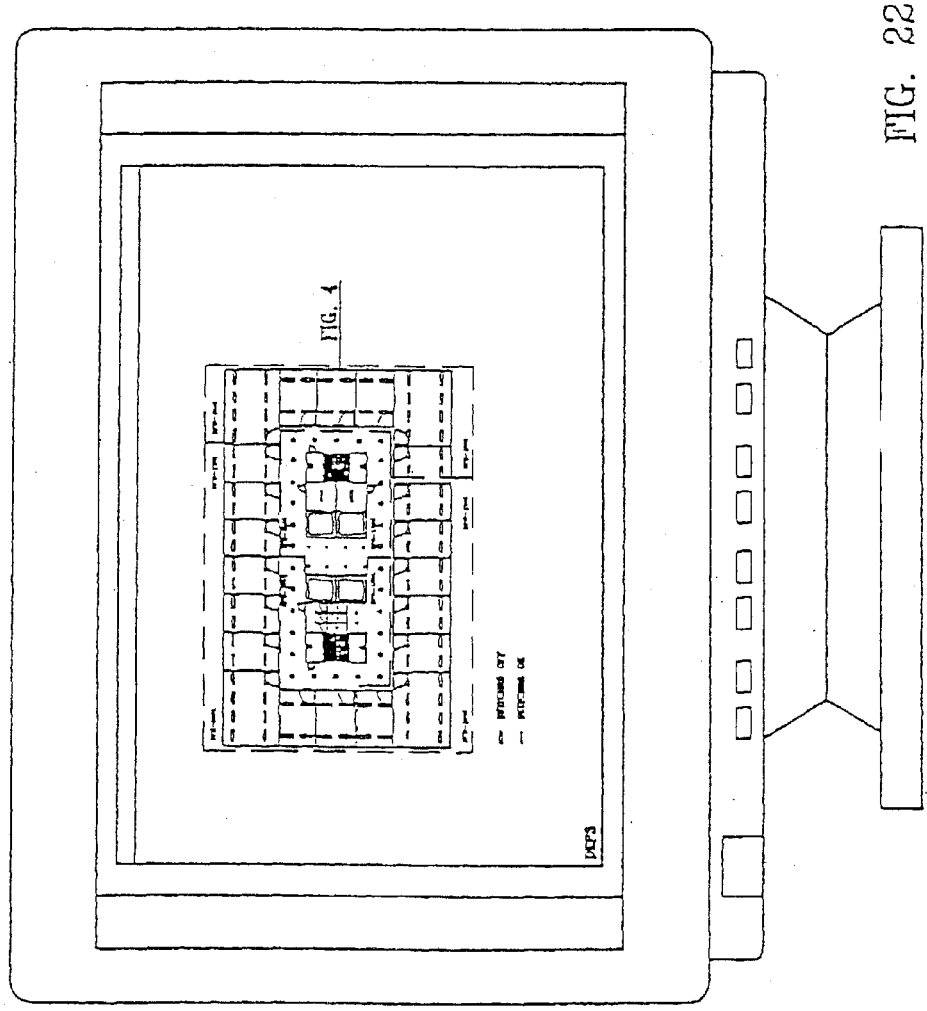
FIG. 22 shows a computer screen displaying a floor plan with electrical units.

FIG. 22 is a computer monitor on which is displayed a floor plan (FIG. 4) with electrical units, in this case light fittings. Switching on and off of the electrical units using this monitor is possible because the monitor is coupled to the computer with computer program and the data network as shown in the previous figure.

Figure 23:
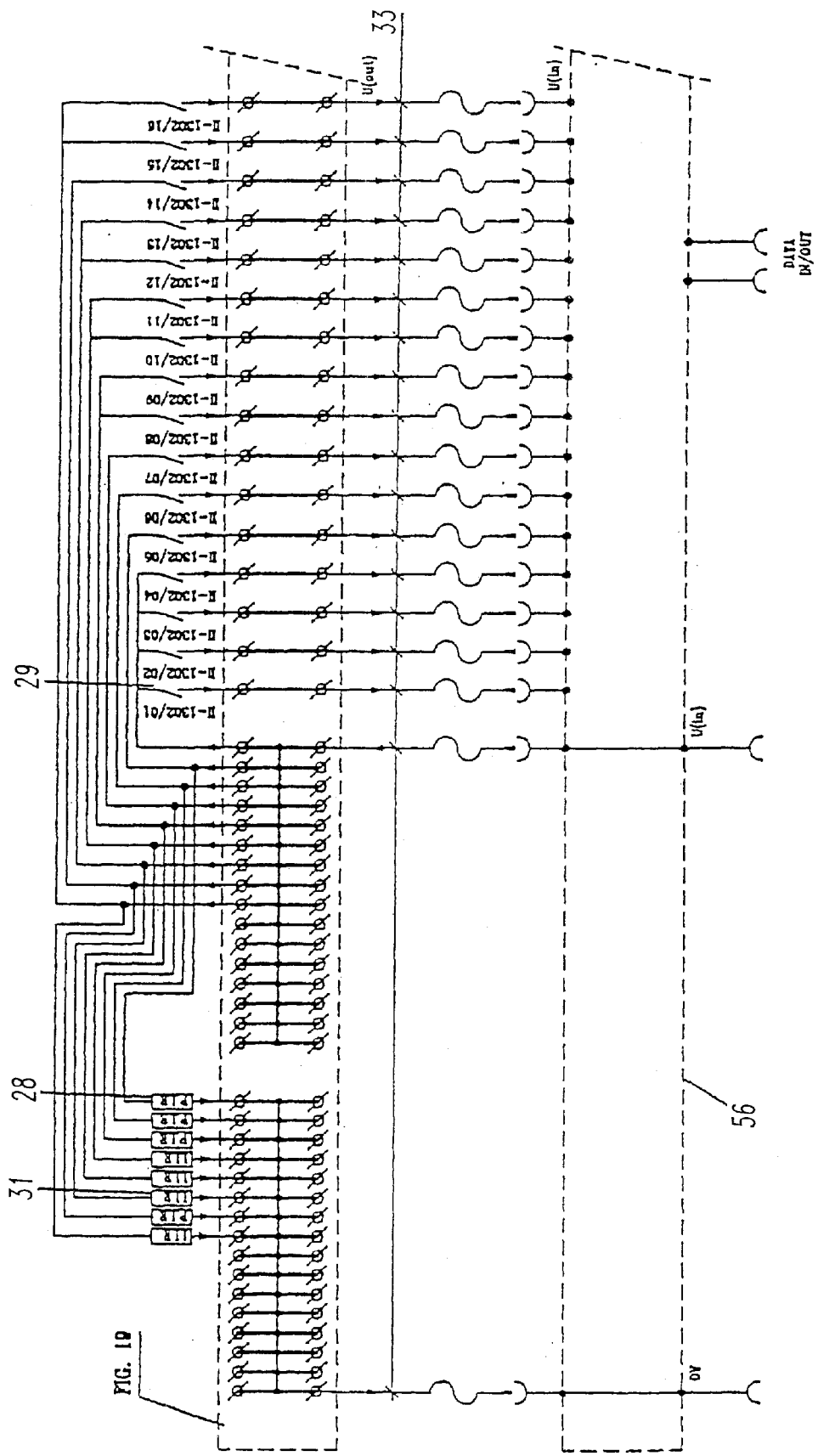
FIG. 23 is an example of a wiring diagram of the coupling of signal media.

FIG. 23 is an example of a wiring diagram of the coupling of signal media, designated for instance with the reference numerals 28, 29 and 31 with a signal input unit, via an "Input interface" (see FIG. 19).

Figure 24:
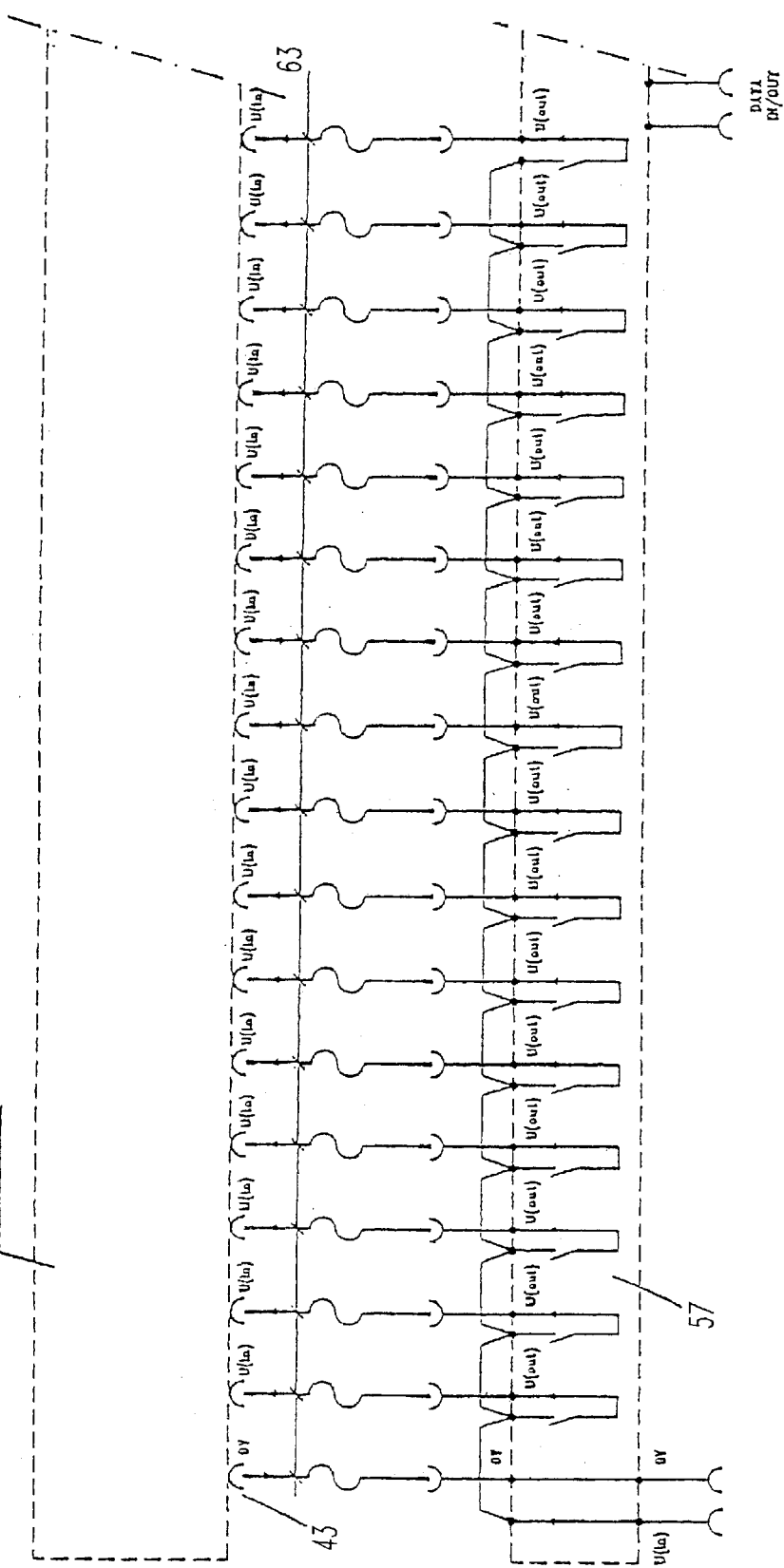
FIG. 24 shows an example of a wiring diagram of the coupling of a voltage output unit to a DEPS module.

FIG. 24 is an example of a wiring diagram of the coupling of the voltage output unit 57 to a DEPS module (see FIG. 7).

Figure 25:
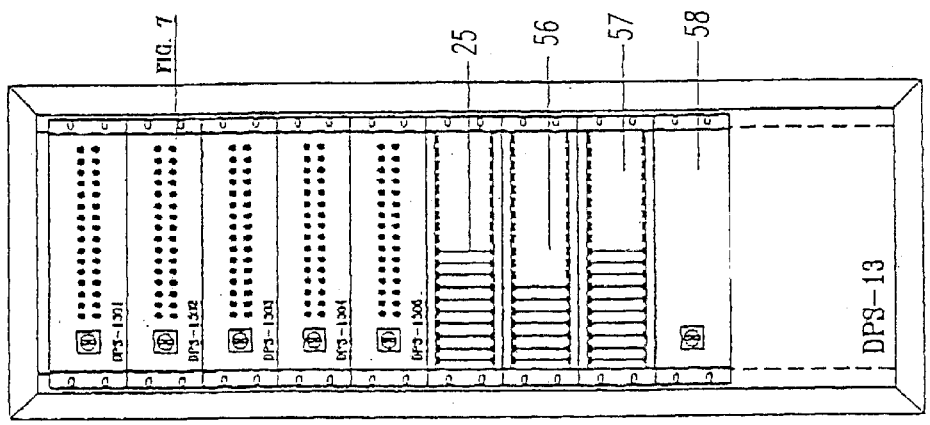
FIG. 25 shows an example of a multi-unit panel in front view, which multi-unit panel comprises inter alia a number of DEPS modules and other units.

FIG. 25 is an example of a multi-unit panel in which are accommodated, among others, the following components: DEPS modules (FIG. 7), Splitter modules 25, signal input unit 56, voltage output unit 57, power supply unit 58 and other mounting means.

FIG. 26 shows a schematic structure of the application of a system with DEPS modules for a traffic light installation in which, in addition to the components already mentioned above, the following components are also shown: traffic detection loops 67, pulse push-buttons 68 for pedestrians and cyclists and traffic lights 69.

Figure 27:
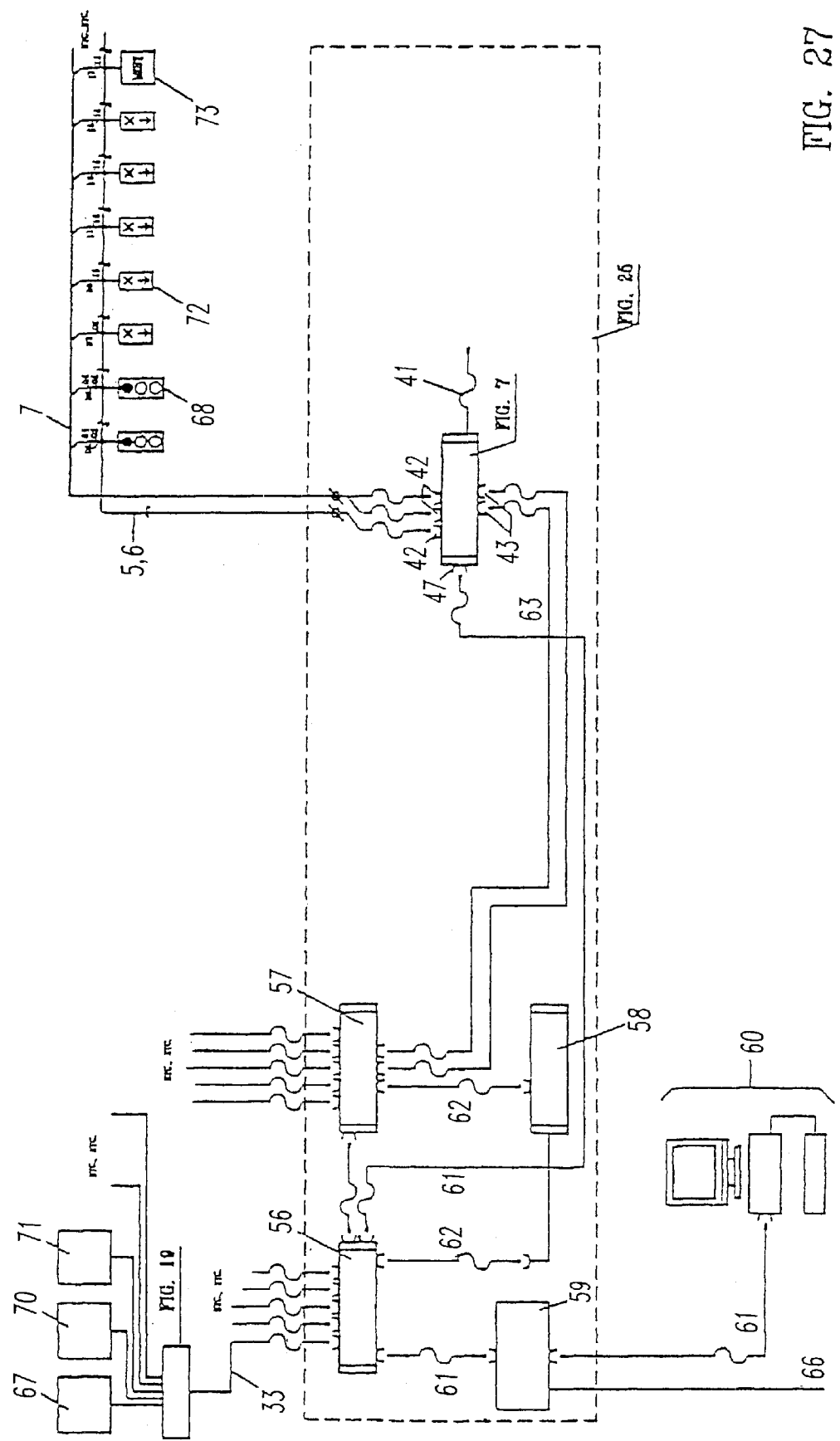
FIG. 27 shows a traffic monitoring installation according to the invention.

FIG. 27 shows a schematic structure with DEPS modules for a traffic monitoring installation in which, in addition to the components already mentioned above, inter alia the following components are shown: traffic detection loop 67, a speed detector 70, a fog detector 71, traffic indicators 68, 72, 73, including fog indicators 73.

Figure 28:
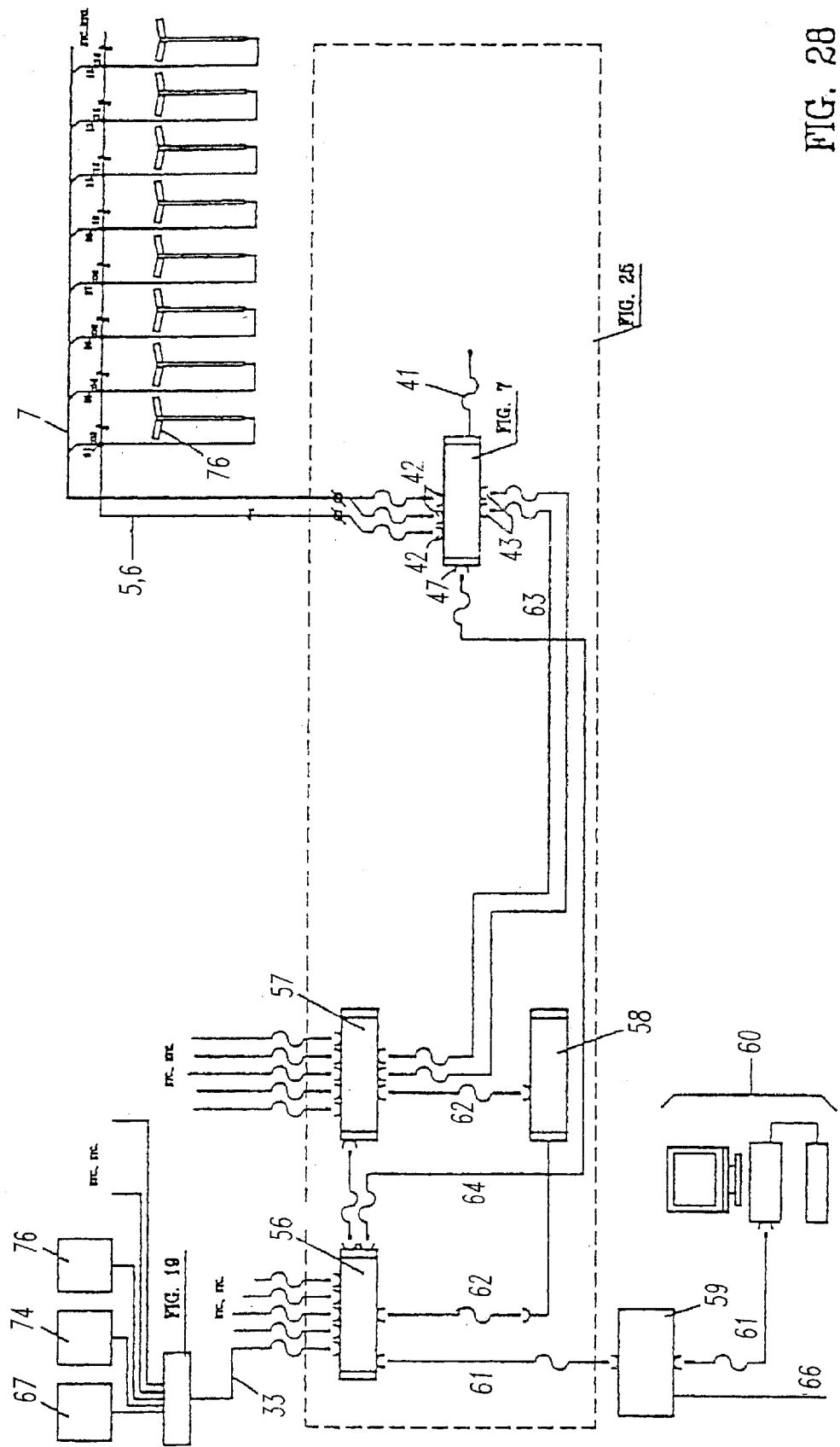
FIG. 28 shows a street lighting installation according to the invention.

FIG. 28 shows a schematic structure with DEPS modules for a public street lighting installation with inter alia the following additional components: traffic detection loops 67, a movement detector 74, a dimmer switch 75 and street lamp posts 76.

The designing and installing of this installation can take place quickly, reliably and in very well controllable manner with a structural and well-considered construction:

step 1: determining position of fittings and connection points (see FIG. 4);

step 2; completing an information form of a switching module and designing installation drawings with codings (see for instance FIG. 5);

step 3: completing a programming form and designing installation drawings (see FIGS. 5 and 6);

step 4: assembling empty multi-unit panels (see FIG. 25, excluding the components);

step 5: construction of installation according to installation drawings and placing and connecting of multi-unit panels;

step 6: filling in measurement data in the information form for switching module;

step 7: assembling modules and programming the input and output and computer system in the factory; and step 8: shortly before delivery, placing the diverse modules and inserting the connectors.

Operation of the whole installation can take place as follows on a computer with peripherals.

Starting the computer and logging in, whereafter a menu appears. When continuing, there appears on the screen a list which asks which building complex is concerned. By typing or selecting relevant information a floor plan of a determined complex appears. A north arrow indication can be shown on this floor plan so that the location of the complex can be related to its surroundings. Said buildings are indicated on this floor plan. By now selecting a building there appears a side view of a building supported by a direction indication. It is herein possible to request diverse side views of the building. Diverse storeys are shown on the side views. It is for instance possible to switch on lighting by clicking on the spaces on the sides of the building. Promotional campaigns for the surrounding area for instance can hereby be shown. It is herein also possible to preprogram particular promotional campaigns, so that at any desired moment a particular image can be displayed automatically. If however it is required to switch on or switch off the lighting of for instance one or more storeys, or to view the status thereof, the storeys can be clicked on for this purpose, so that the floor plan of the relevant storeys appears. Other operations can also be requested, such as for instance the operation of sockets, sunblinds, electrically lockable and unlockable doors and so on. This is therefore a multi-functional system. On the floor plan electrical units can be switched on or switched off by clicking thereon or selecting a group thereof. It is also possible to operate a complete security installation with the DEPS control system. The control system can therefore be used multi-functionally. It is also possible to present on the system a plurality of forms of information relating to the status of the installation, such as for instance: the number of light fittings switched on; of a group of buildings, per building, per storey, per outside wall etc.; the switched on power of the electrical units; of a group of buildings, per building, per storey, per outside wall etc.; the energy consumption per hour, per day, per month, per year of a group of buildings, per building, per storey, per outside wall etc. By storing the wide variety of information relating to user appliances in the memory of the central control unit it is thus possible in simple manner to request characteristic figures.

Control and switching equipment in the multi-unit panels, which are deployed centrally at diverse locations, function as autonomous installations. Operation can therefore also continue to take place locally in the case of failure of the central control unit.

Remote control is in principle possible when the installation is coupled to the international telephone network and there is a good data connection, so that the user appliances can be operated using a computer from any location in the world. This is particularly possible on the basis of ISDN telephone lines.

Operation of lighting can also take place by means of a local switching medium, for instance a pulse push-button in an office, by a group of control pulse push-buttons in a department, couplings with card readers, infrared control using PIR (passive infrared) detectors and so on, as the client desires. These signal media are coupled locally to the relevant input cards which are subsequently coupled via output cards to the DEPS modules. In the case of failure of the operating system or during maintenance operations the electrical units can be switched outside the system using one or more emergency control panels which are fed from power supply units. The emergency control panels are coupled by means of multi-core cabling to the relevant switching module with interposing of a Splitter module 25.

The system according to the invention can find application in any type of building, for instance utility building, health care buildings, dwellings and so on, but also for public electrical units, such as traffic light installations, traffic monitoring systems and street lighting installations. Reference is made in this respect to inter alia FIG. 26, 27 and 26. The FIG. 29, 30 and 31 to be described below relate to emergency power supplies, a sun protection installation and a door operating system.

Figure 29:
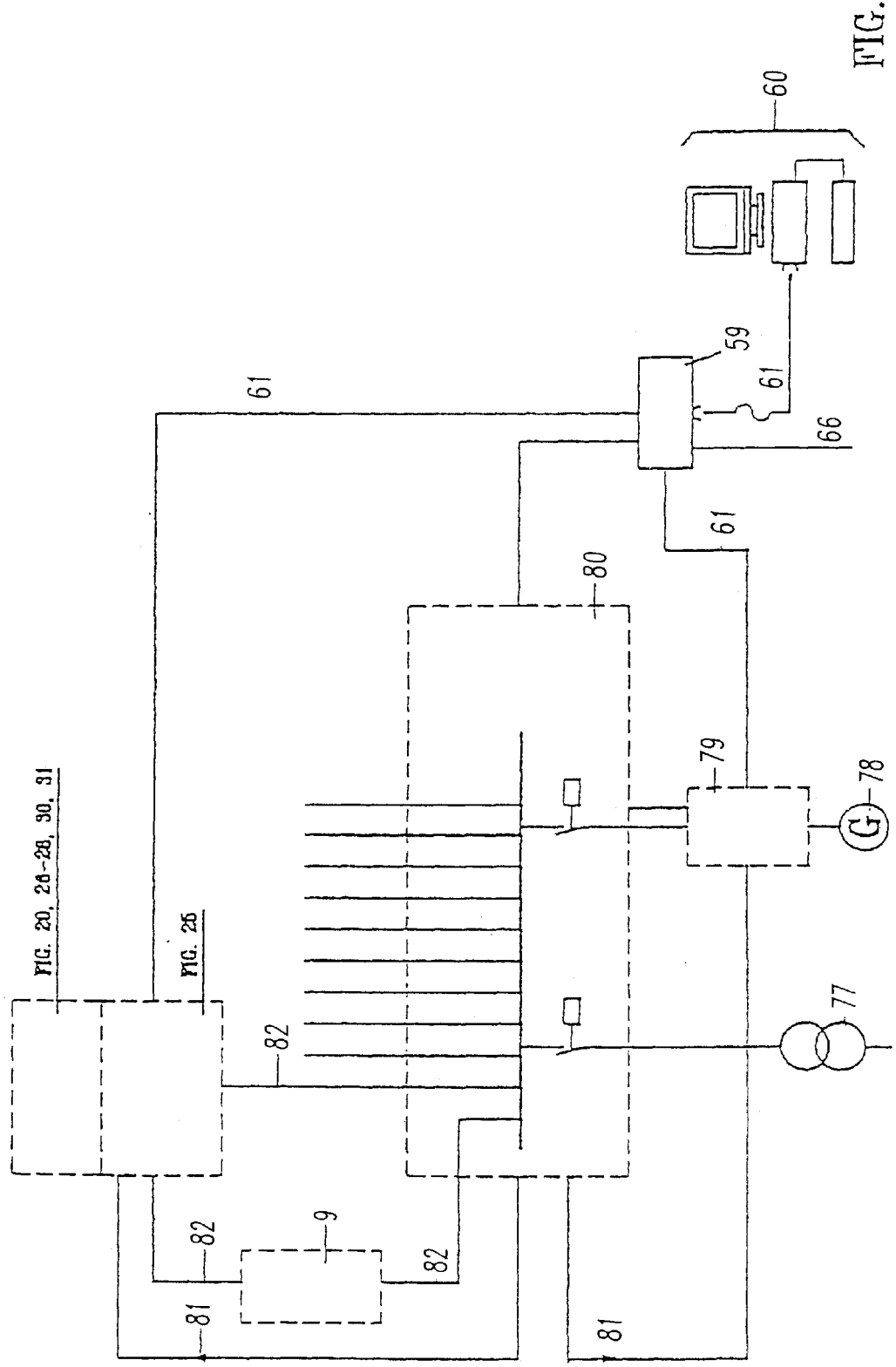
FIG. 29 shows a schematic diagram of an emergency power installation according to the invention.

FIG. 29 shows a schematic diagram, comprising mutually coupled DEPS installations (see also FIGS. 20, 26, 27, 28, 30, 31) with components in a multi-unit panel (FIG. 25) with a switching and distribution device 80 and/or a no-break unit 9. This switching and distribution device is fed from a transformer 77 from the public energy distribution mains and an emergency power generating set 78 with associated control and switch box 79. The reference numeral 82 refers to feed lines for equipment in the multi-unit panel (FIG. 25), in this embodiment also via no-break unit 9. When the voltage of the public energy distribution mains falls away, signals are passed via signal lines 81 to the control and switch box 79 in order to start the emergency power generating set and to the DEPS installation in order to switch off the switched-over electrical units. If the emergency power generating set is switched onto the switching and distribution device, electrical units can be selectively switched onto the emergency power generating set in a predetermined selection, either automatically or manually, this using a Central Processor unit (CPU) 59, which unit is connected by means of signal lines 61 to computer 60, control and switch box emergency power generating set 79 and input and output modules 56, 57 in the multi-unit panel (FIG. 25).

FIG. 30 shows a schematic diagram of a sun protection installation with application of DEPS modules, wherein in addition to the above stated components the following parts are also used: sunblind control motors 84 for raising and lowering sunblinds, awnings and the like, end switches 85 for causing the sunblind control motors to stop at the end of a movement stroke and sunblind operating switch 83.

FIG. 31 shows a schematic diagram of a door operating installation with DIPS module. Herein the following components are further used: door operating push-button 86 for unlocking electrically controllable door locks 86 and signal lines 87 coupled to the input module 56 for lock, bolt and door position indicators. The transformer 89 serves to supply a low voltage of for instance 24 V for electromagnetic control of the locks in question, for instance by making use of a solenoid with a core movable therein.

FIGS. 32 and 33 show respectively an example of an electrical cable according to the invention and application thereof in a configuration corresponding with FIG. 2.

FIG. 32 shows a multi-core electrical cable with a number of current conductors, which are designated in groups with 101, 102 and 103 and are electrically insulated from each other by individual insulation sheaths. FIG. 32 also shows that the neutral core 101 and the earth core 102 have a larger diameter than phase cores 103. Cable 120 is intended in this embodiment to be laid in the ground. For this purpose it is provided in this embodiment with a metal reinforcement 105, although in other applications this metal reinforcement 105 can be omitted. The insulation sheaths of the individual cores are designated with the reference numeral 104. The collective sheath which holds together and encloses the bundle of cores is designated with 124.

FIG. 22 shows the application of cable 120 in an electrical circuit as according to FIG. 2, wherein the electrical units, in this case light fittings 126, are supplied with voltage from switching module 127, which incorporates the following components: fuses 44 against overcurrent, relay 23 with switch contacts 4 and connector chassis part 42 (see also FIG. 3). The cable according to FIG. 32 is connected to connector 42 using connector 212. The relay 32 is actuated by means of the switches 21, which are connected by means of control current cores 20 bundled in cable 214 to a connector chassis part 43 on the DEPS module. Electrical units 126 and DEPS module 127 are supplied with voltage from an end group of a switching and distribution device 24, in which a group switch with main fuse 22 is arranged for the protection against overcurrent of cores 130, 131, 132 of feed cable 133. The safety devices 22 and 44 are mutually selective, as will be apparent from the foregoing description of the principles of the invention.

What is claimed is:

1. A circuit for selectively providing electric supply voltage from an input feed line having a phase conductor and a neutral conductor connected to a respective phase terminal and a neutral terminal of one or a plurality of parallel connected electrical fixtures, each fixture configured to be electrically connected to an electrical unit which uses electricity, which comprises:

a neutral connection between the neutral conductor and each neutral terminal;

a phase connection between the phase conductor and each phase terminal, in which phase connection is arranged a current control element; and an overcurrent safety element incorporated in each phase connection for limiting the current to a maximum value determined therefor, wherein each phase connection has a cross-sectional surface area adapted to the maximum current therethrough.

2. The circuit as claimed in claim 1, wherein the current control element is a switch or relay.

3. The circuit as claimed in claim 1, wherein the current control element is a controller.

4. The circuit as claimed in claim 1, wherein each neutral connection has a cross-sectional area adapted to the maximum current therethrough.

5. The circuit as claimed in claim 1, wherein each overcurrent safety element is arranged in its corresponding phase connection adjacent the phase conductor.

6. The circuit as claimed in claim 1, wherein only the part of each phase connection between the overcurrent safety element and the phase terminal has a cross-sectional area adapted to the maximum current therethrough.

7. The circuit as claimed in claim 1, further comprising a controller which is configured to control the current control elements under program control on the basis of external instructions received from one or more of a keyboard, a mouse, light sensors or warning sensors.

8. The circuit as claimed in claim 7, further comprising:

a housing configured to receive a plurality of the current control elements, each current control element controllable by the controller via control terminals thereof;

a plurality of overcurrent safety elements, each overcurrent safety element connected in series with one of the current control elements;

a first connecting means connected between the phase and neutral connections, and the phase and neutral conductors, respectively; and a second connecting means connected between the control terminals of the control elements and the controller, wherein each electrical fixture includes a means for electrically connecting the phase terminal and the neutral terminal thereof to a phase contact and a neutral contact, respectively, of the electrical unit connected thereto.

9. The circuit as claimed in claim 8, wherein the first and/or second connecting means is coupled fixedly to the housing.

10. The circuit as claimed in claim 7, comprising a bypass means for controlling the current control elements without the operation of the controller.

11. The circuit as claimed in claim 7, wherein the controller includes a display for displaying one or more of (i) the total electrical power consumed by one or more of the electrical units; (ii) a first interval the one or more electrical units receives electrical power; and (iii) the power consumption of one or more electrical units during a second interval.

12. The circuit as claimed in claim 1, further including an earth connection between an earth conductor of the input feed line and an earth terminal of each electrical fixture.

13. An electrical cable comprising:
  a plurality of insulated phase connections each having a first cross-sectional area;
  an insulated neutral connection having a second cross-sectional area which is larger than the first cross-sectional area; and
  a jacket enclosing all the insulated connections, wherein each connection is an electrical conductor.

14. The cable as claimed in claim 13, further comprising an insulated earth connection having a third cross-sectional area which is greater than the first cross-sectional area.

15. The cable as claimed in claim 14, wherein the second and third cross-sectional areas are the same.

* * * * *

UNITED STATES PATENT AND TRADEMARK OFFICE
CERTIFICATE OF CORRECTION

PATENT NO.    : 6,351,083 B1
DATED         : February 26, 2002
INVENTOR(S)   : Ronaldus Paulus Maria Ten Holter It is certified that error appears in the above-identified patent and that said Letters Patent is hereby corrected as shown below:

<u>Title page,</u>
Item [22], PCT Filed, "Jan. 2, 1999" should read -- Jan. 2, 1998 --

<u>Column 1,</u>
Line 24, "o" should read -- of --.
Line 27, "____" should read -- ~ --.
Line 33, "chat" should read -- that --.

<u>Column 2,</u>
Line 8, "Following" should read -- following --.

<u>Column 4,</u>
Line 25, "Systems" should read -- systems --.
Line 38, "co wands" should read -- commands --.
Line 53, "reed" should read -- feed --.

<u>Column 6,</u>
Line 66, "ease" should read -- case --.

<u>Column 7,</u>
Line 18, "co" should read -- to --.
Line 46, "a," should read -- a --.
Line 47, "point." should read -- point --.

<u>Column 8,</u>
Line 6, "input," should read -- input --.
Line 39, "sore" should read -- more --.
Line 45, "unit 5" should read -- unit 58 --.

UNITED STATES PATENT AND TRADEMARK OFFICE
CERTIFICATE OF CORRECTION

PATENT NO. : 6,351,083 B1
DATED : February 26, 2002
INVENTOR(S) : Ronaldus Paulus Maria Ten Holter It is certified that error appears in the above-identified patent and that said Letters Patent is hereby corrected as shown below:

Column 10,
Line 54, "26." should read -- 28. --.

Column 11,
Line 21, "DIPS" should read -- DEPS --.
Line 46, "22" should read -- 35 --.

Signed and Sealed this

Twenty-seventh Day of August, 2002

Attest:

Attesting Officer

JAMES E. ROGAN
Director of the United States Patent and Trademark Office